United States Patent [19]
Ershov et al.

[11] Patent Number: 5,229,867
[45] Date of Patent: Jul. 20, 1993

[54] METHOD OF AND APPARATUS FOR MAKING A HALF-TONE REPRODUCTION OF AN IMAGE

[76] Inventors: Geny S. Ershov, prospekt Metallistov, 84, kv. 6; Jury V. Kuznetsov, 12 linia, 31, kv. 4; Vladimir M. Sobolev, Pushkinskaya ulitsa, 2/79 kv. 65; Andrei A. Schadenko, Kuznetsovskaya ulitsa, 22, kv. 73, all of Leningrad, U.S.S.R.

[21] Appl. No.: 634,431

[22] Filed: Dec. 27, 1990

[51] Int. Cl.$^5$ .............................................. H04N 1/40
[52] U.S. Cl. ................................... 358/456; 358/459; 358/455
[58] Field of Search ................. 358/456, 458, 459, 455

[56] References Cited

U.S. PATENT DOCUMENTS

| | | | |
|---|---|---|---|
| 3,904,816 | 9/1975 | Taudt | 358/456 |
| 4,498,108 | 2/1985 | Lindemann | 358/459 |
| 4,644,392 | 2/1987 | Yamada | 358/456 |
| 4,647,962 | 3/1987 | Rosen et al. | 358/456 |
| 4,700,235 | 10/1987 | Gall | 358/459 |
| 4,701,811 | 10/1987 | Moriguchi et al. | 358/458 |
| 4,821,109 | 4/1989 | Roe | 358/456 |
| 5,055,943 | 10/1991 | Kishida | 358/458 |
| 5,067,025 | 11/1991 | Kitagawa | 358/458 |
| 5,109,282 | 4/1992 | Peli | 358/458 |

FOREIGN PATENT DOCUMENTS

2105144 3/1983 United Kingdom.

*Primary Examiner*—Edward L. Coles, Sr.
*Assistant Examiner*—Fan Lee
*Attorney, Agent, or Firm*—Lilling & Lilling

[57] ABSTRACT

A method of making a half-tone reproduction of an image includes the step of forming an image consisting of half-tone dots having a greater size at darker image units areas. Each image unit area is divided into a plurality of elements. The elements are formed dark, making up a half-tone dot, or light dependent on the comparison between the reflectivity of a corresponding unit area and values of a half-tone function which is a two-dimensional periodic function of the coordinates of the elements. The method further includes determining variation of the reflectivity of the image in two mutually opposite directions at the place of location of each unit area and comparing the reflectivity with the half-tone function value corresponding to the coordinates of the element shifted with respect to the element to be formed in a direction of a greater decrease in reflectivity, if such a decrease takes place. As a result, the half-tone dots lying on an image contour are shifted towards a darker part of the image. An apparatus for reproduction of an image comprises a light source forming an image and connected to the output of a comparator having its inputs connected to the outputs of a video signal source and of a half-tone function generating unit. The inputs of the latter are connected through adders to the outputs of a unit generating coordinates of the elements of the receiving medium unit areas and to the outputs of coordinate correction units.

7 Claims, 11 Drawing Sheets

| | M | N | P | |
|---|---|---|---|---|
| 1 | · | ○→ | ◯ | $K_M > K_N > K_P$ |
| 2 | ◯ | ←○ | · | $K_M < K_N < K_P$ |
| 3 | ○ | ○→ | ◯ | $K_M = K_N > K_P$ |
| 4 | ◯ | ←○ | ○ | $K_N = K_P > K_M$ |
| 5 | ○ | ·→ | ◯ | $K_N > K_M > K_P$ |
| 6 | ◯ | ←· | ○ | $K_N > K_P > K_M$ |
| 7 | ○ | ◯ | · | $K_N < K_M < K_P$ |
| 8 | ◯ | ○ | ◯ | $K_N > K_M = K_P$ |
| 9 | · | ◯ | ○ | $K_N < K_P < K_M$ |
| 10 | ○ | ◯ | · | $K_N < K_M < K_P$ |
| 11 | ○ | ◯ | ○ | $K_N = K_M < K_P$ |
| 12 | ○ | ◯ | ◯ | $K_N = K_P < K_M$ |

METHOD OF AND APPARATUS FOR MAKING A HALF-TONE REPRODUCTION OF AN IMAGE

FIELD OF THE INVENTION

The present invention relates to polygraphic methods of and apparatuses for producing images, and more particularly to methods of and apparatuses for making a half-tone reproduction of an image. The invention can be used in polygraphic scanners, input/output devices of electronic graphic data processing systems and facsimile equipment.

BACKGROUND OF THE INVENTION

A half-tone reproduction of an original image, produced on an appropriate receiving medium, has a dot pattern, i.e., consists of a plurality of separate dots having greater areas (sizes) on darker portions of the image than on its light portions. A typical method of making a half-toe reproduction of an image includes generating signals corresponding to the reflectivities of separate unit areas of the image to be reproduced and forming dots in the receiving medium unit areas corresponding to the unit areas of the image. The area of a dot in each unit area of the receiving medium depends on the reflectivity of the image unit area corresponding to this unit area of the receiving medium. When a positive image is formed, the dot area is the greater, with the smaller of the reflectivity of the corresponding image unit area. When a negative image is formed, the dot area is the greater, with the greater of the reflectivity of the corresponding image unit area. Each dot usually lies in the center of a corresponding unit area of the receiving medium.

When half-tone dots are formed in unit areas corresponding to image unit areas intersected by a continuous contour, i.e., by a boundary between a relatively very dark portion and a relatively very light portion of the image, the relative position of the contour and a unit area affects only the area of a corresponding dot (which area is determined by the average reflectivity of the unit area divided by the contour into a light portion and a dark portion). In such a case a considerable part of the dot, and even its greater part or the whole dot, may be formed on that side of the contour which should be light. As a result, the contour becomes slurred and is perceived visually as having a stepped shape. Deterioration in the perception of a contour becomes especially noticeable when the contour passes at a small angle to the line along which the half-tone dots are disposed. When small elements of an image are reproduced, this situation leads to a noticeable distortion of their shape or to their blurring, and, in the case of very small elements, even to their disappearance during reproduction. All this results in deterioration of the quality of the obtained image.

Known is a method of making a half-tone reproduction of an image (U.S. Pat. No. 3,904,816), according to which the unit areas on the receiving medium are formed in such a way that the reflectivity of a receiving medium unit area is determined not only by the reflectivity of the respective unit area of the image to be reproduced, but also by the reflectivities of the adjacent unit areas adjoined it on different sides. According to this method, the signal corresponding to the reflectivity of a given image unit area is corrected by a value determined by the difference between the reflectivity of this unit area and the arythmetic mean of the reflectivities of this unit area and the adjacent unit areas. This method is known as "electronic unsharp masking".

With such a method, the image near the boundary dividing its dark and light portions becomes somewhat darker on the dark side and somewhat lighter on the light side as if "underlying" the image contour. In some cases this improves visual perception of the contour and creates an illusion of a sharper reproduction of the contour. However, the stepped shape of the contour is not actually smoothed and may become even more noticeable, i.e., the sharpness of image reproduction is not really improved. For the same reason, such a method does not improve reproduction of small image elements.

Known is a method (U.S. Pat. No. 3,498,108) including determining the reflectivity of each of the four portions making up an image unit area corresponding to a half-tone dot of the image reproduced on the receiving medium. With this method, each half-tone dot is made up of four parts adjoining one another and the center of the respective unit area, each part lying within that portion of the receiving medium unit area which corresponds to the respective portion of the image unit area and having an area determined by the reflectivity of this portion. A half-tone dot in a unit area intersected by an image contour is deformed in such a way that the area of the dot part located on the dark side of the contour becomes greater, while the area of the dot part located on the light side of the contour becomes smaller, Some, more or less considerable, part of the dot in this case always remains in the central area of the respective unit area.

Such deformation of a half-tone dot towards a dark side of the image allows the stepped shape of the contour to be smoothed to some extent and the contour itself to be made somewhat sharper. Such a method makes it also possible to reduce to some extent distortions in the shapes of small elements and their blurring. However, since the dot parts are grouped together around the center of the respective unit area, a considerable part of the dot, and even its greater part or the whole dot, may in this case also be found on that side of the contour which should be light. As pointed out above, this adversely affects visual perception of the contours and small elements of the reproduced image and thus the quality of its reproduction.

Besides, the need to determine four reflectivity values for each image unit area leads to a corresponding increase in the amount of the data according to which the image is reproduced, and hence in the time required for processing and transmitting this data.

Known is a method of making a half-tone reproduction of an image (GB, A, 2105114), according to which each of the receiving medium unit areas corresponding to the image unit areas the reflectivities of which are to be determined is divided into a plurality of smaller elements forming a rectangular grid. The half-tone dots are formed according to the results obtained by comparing the reflectivities of the image unit areas with the values of a certain predetermined half-tone function which is a two-dimensional periodic function of the mutually orthogonal coordinates of said elements. Such a method includes generating signals corresponding to the reflectivities of the image unit areas and signals corresponding to the half-tone function. The signal corresponding to the reflectivity of an image unit area is compared with the signals corresponding to the half-tone function values determined by the coordinates of the elements of the receiving medium unit area corresponding to this image unit area. Each of the elements of the receiving medium unit areas is formed dark or light depending on the difference between the half-tone function value determined by the coordinates of this element and the reflectivity of the image unit area corresponding to the receiving medium unit area incorporating this element. If a positive image is to be produced on the receiving medium, an element is formed light when the reflectivity value is greater than the half-tone function value, and dark when the reflectivity value is smaller than the half-tone function value. If a negative image is to be produced on the receiving medium, an element is formed light when the reflectivity value is smaller than the half-tone function value and dark when the reflectivity value is greater than the half-tone function value.

According to this method, each dot is constituted by a plurality of dark elements formed within one spatial period of the half-tone function, where its values differ from a corresponding reflectivity value (or from corresponding reflectivity values if the elements of the half-tone dots are located in receiving medium unit areas corresponding to different image unit areas) in a predetermined sense, i.e., in a positive sense when a positive image is to be produced and in a negative sense if a negative image is to be produced. The number of such dark elements, and hence the dot area, will therefore depend on the reflectivity of the corresponding image unit area.

If such a method is used to form half-tone dots on unit areas intersected by an image contour, the disposition of the contour will effect only the area of each such dot, which area will be determined by the reflectivities of the image unit areas corresponding to the receiving medium unit areas incorporating the elements constituting the dot. As a result, a considerable part of the dot, and even its greater part or the whole dot, may be formed on that side of the contour which should be light. This adversely affects reproduction of contours and small elements of an image and thus the quality of the reproduced image.

To make a half-tone reproduction of an image by comparing the reflectivities of the image unit areas with the values of a half-tone function, it is known to use a device (GB, A, 2105144) comprising a video signal source for sequentially producing reflectivity values of image unit areas. The device further comprises a light source, a means for sequentially directing the beam of the light source to elements of the receiving medium unit areas corresponding to image unit areas, a controlled interrupter for interrupting the beam of the light source, a timing unit and a half-tone function generating unit for generating values of a half-tone function which is a periodic function of the coordinates of the receiving medium unit area element. A coordinate generating unit for generating coordinates of the elements of the receiving medium unit areas is connected between the timing unit and the half-tone generating unit. The control input of the interrupter is connected to the output of a comparison unit having its one input connected to the video signal source and its other input connected to the output of the half-tone function generating unit. The coordinate generating unit produces corresponding addresses according to which the half-tone function values stored in the half-tone function generating unit are extracted therefrom. These values are compared in the comparison unit with corresponding reflectivity values coming from the video signal source.

This apparatus has the same disadvantages as the method which it implements.

SUMMARY OF THE INVENTION

It is an object of the present invention to provide a method and apparatus for making a half-tone reproduction of an image, which permit improvement in the quality of the obtained image.

It is another object of the present invention to provide a method and apparatus for making half-tone reproduction of an image, which ensure formation of half-tone dots in a manner to reduced distortions in reproduction of the boundaries between dark and light portions of the image.

It is still another object of the present invention to provide a method and apparatus for making a half-tone reproduction of an image, which permit improvement in the quality of reproduction of fine details of the image.

With these and other objects in view, there is provided a method of making a half-tone reproduction of an image on a receiving medium, comprising generating signals corresponding to the reflectivities of image unit areas and comparing the signal corresponding to the reflectivity of each image unit area with signals corresponding to the values of a half-tone function. The half-tone function is a two-dimensional periodic function of two mutually orthogonal coordinates of the elements into which the receiving medium unit areas respectively corresponding to the image unit areas are divided.

According to the invention, the proposed method further comprises determining for each given image unit area values characterizing variation of reflectivity at the place of location of this given unit area in two mutually opposite directions along each of two mutually perpendicular axes. As a result of this, it may be found that the reflectivity at the place of location of a given image unit area in both the mutually opposite directions along each of said mutually perpendicular axes does not vary in a predetermined sense or varies in this sense to an equal degree. In such an event each element of the receiving medium unit area corresponding to said given image unit area is formed light if the half-tone function values determined by the coordinates of this element differs from the reflectivity of this image unit area in said predetermined sense. If the half-tone function value determined by the coordinates of this element differs from the reflectivity of this image unit area in the opposite sense, this element is formed dark. On the other hand, it may be found that the reflectivity at the place of location of a given image unit area in one of the mutually opposite directions along one of said mutually perpendicular axes varies in said predetermined sense, whereas in the opposite sense it varies in the same sense to a lesser degree or in the opposite sense. In such an event, to form each given element of the receiving medium unit area corresponding to said given image unit area, the position of an element shifted with respect to this element along this axis is determined. The shifted element is shifted in the direction of the lesser degree of variation of the reflectivity in said predetermined sense or in the direction of variation of the reflectivity in the opposite sense. The degree of the shift is the greater. When the degree of variation of the reflectivity in the direction opposite to the shift is the greatest. If the shifted element lies within the same unit area as the given element, the latter is formed light when the half-tone function value is determined by the coordinates of the shifted element differs from the reflectivity of said given element in said predetermined sense. When the half-tone function value determined by the coordinates of the shifted element differs from the reflectivity of said given image unit area in the opposite sense, the given element is formed dark. If the shifted element lies outside the unit area within which lies the given element, the latter is formed light.

When such a method is used, a half-tone dot located in an area intersected by a contour of the image is shifted towards a dark portion of the image so that only a small part of the dot will be located on the light side of the image contours. This permits reduction of distortions in reproduction of a contour of an image, i.e., a boundary between dark and light portions of the image. The reproduced contour of the image will be even and will not be perceived visually as having a stepped shape, even if the contour passes at a small angle to the line along which the half-tone dots are disposed. This also permits reduction of distortions in the shapes of small elements of the image and general improvement in the image quality.

Said values characterizing variation of reflectivity at the place of location of an image unit area may be the differences between the reflectivity of this unit area and the reflectivity of four adjacent unit areas. Two of said four adjacent unit areas adjoin the given unit area on opposite sides and are disposed therewith along one of said mutually perpendicular axes. The other two adjoin the given unit area on opposite sides and are disposed therewith along the other of said mutually perpendicular axes.

According to another embodiment, said values characterizing variation of reflectivity at the place of location of an image unit area are the differences between the reflectivity of this unit area and the reflectivities of its portions. Two of these values are the differences between the reflectivity of the whole unit area and the reflectivity of each of its two portions lying on different sides of a straight line passing through the middle of this unit area along one of said mutually perpendicular axes. The two other values are the differences between the reflectivity of the whole unit area and the reflectivity of each of its two portions lying on different sides of a straight line passing through the middle of this unit area along the other of said mutually perpendicular axes.

With these and other objects in view, there is also provided an apparatus comprising a video signal source for sequentially producing reflectivity values of image unit areas, a coordinate generating unit for generating coordinates of the elements of the receiving medium unit areas corresponding to the image unit areas, and a half-tone function generating unit for generating values of a half-tone function which is a periodic function of the coordinates of the receiving medium unit area elements. The apparatus further comprises a timing means, and a comparison unit having its first input connected to the output of the half-tone function generating unit. The output of the comparison unit is connected to a beam interrupter adapted to interrupt the light beam of a light source provided with means for directing the light beam to the elements of the receiving medium unit areas. According to the invention, the video signal source has five outputs. The video signal source develops at its first output the reflectivity value of the image unit area corresponding to the receiving medium unit area incorporating the element to which the light beam of the light source is being directed. This output is connected to a second input of the comparison unit. The video signal source develops at its second and third outputs, respectively, the reflectivity values of two auxiliary image unit areas lying in the region of the unit area the reflectivity of which is being produced at the main output, on different sides of one of two mutually perpendicular straight lines passing through the middle of this unit area. The video signal source develops at its fourth and fifth outputs, respectively, the reflectivity values of two auxiliary image unit areas lying in the region of the unit area the reflectivity of which is being produced at the first output, on different sides of the other of said two mutually perpendicular straight lines. The apparatus further comprises a first correction unit for correcting a first coordinate of the elements of the receiving medium unit areas, a second correction unit for correcting a second coordinate of the elements of the receiving medium unit areas, a first adder and a second adder. First, second and third inputs of the first correction unit are respectively connected to the first, second and third outputs of the video signal source. First, second and third inputs of the second correction unit are respectively connected to the first, fourth and fifth outputs of the video signal source. If the signal at the first inputs of a correction unit differs from at least one of the signals at its second and third inputs in a predetermined sense and the signals at its second and third inputs are different, the correction unit develops at its output a correction signal. The value of the correction signal is a direct function of the difference between the signal at the first input of the correction unit and that of the signals at its second and third inputs which differs from the other signal at these outputs in said predetermined sense. The sight of the correction signal depends on the sign of the difference between the signals at the second and third inputs of the correction unit. First and second inputs of the first adder are respectively connected to the output of the first correction unit and to the first coordinate output of the coordinate generating unit. First and second inputs of the second adder are respectively connected to the output of the second correction unit and to the second coordinate output of the coordinate generating unit. The outputs of the adders are respectively connected to the first and second coordinate inputs of the half-tone function generating unit.

For making a half-tone reproduction of an image when the repetition period of the receiving medium unit areas differs from the period of the half-tone function, the proposed apparatus may further comprise a second coordinate generating unit for generating coordinates of the elements of the receiving medium unit areas, a third adder and a fourth adder. The inputs of the third adder are respectively connected to the first coordinate output of the second coordinate generating unit and to the output of the first correction unit, while the inputs of the fourth adder are respectively connected to the second coordinate output of the second coordinate generating unit and to the output of the second correction unit. The third and fourth adders each has a sign output and a carry output connected to the control input of the beam interrupter for interrupting the light beam of the light source when the sum of the signals at the inputs of any one of these adders falls outside predetermined limits.

Each correction unit may comprise two subtraction circuits, three comparators, a read-only memory, an AND gate and three OR gates. A first input of the first comparators, a read-only memory, an AND gate and three OR gates. A first input of the first comparator, is connected to a first input of the second comparator, to one input of the first subtraction circuit and to one input of the second subtraction circuit, forming the first input of the correction unit. A second input of the first comparator is connected to a second input of the third comparator and to a second input of the first subtraction circuit, forming the third input of the correction unit. A second input of the second comparator is connected to a first input of the third comparator and to a first input of the second subtraction circuit, forming the second input of the correction unit. Each comparator is adapted to produce a predetermined logic signal at its first output when the signal at its first input differs in a predetermined sense from the signal at its second input, and the same logic signal at its second output when the signal at its first input is equal to the signal at its second input. The address input of the read-only memory is connected to the outputs of the subtraction circuits through a two-way switch and a one-way switch. Two inputs of one OR gate are respectively connected to the outputs of the first comparator, while two inputs of another OR gate are respectively connected to the outputs of the second comparator. The outputs of these two OR gates are respectively connected to the inputs of the AND gate. The inputs of the third OR gate are respectively connected to the output of the AND gate and to the first output of the third comparator, while the output of the third OR gate is connected to the control input of the one-way switch. The second output of the third comparator is connected to the control input of the two-way switch. The output of the read-only memory is the output of the correction unit.

According to an embodiment of the invention, the first output of the video signal source and the outputs of the correction units are connected to the second input of the comparison unit and to the first inputs of the first and second adders through a communication channel. One end of the communication channel is connected to a portion of the bit position lines of the first output of the video signal source and to the bit position lines of the outputs of the correction units through a coder. The other end of the communication channel is connected to a portion of the bit position lines of the second input of the comparison unit and to the bit position lines of the first inputs of the first and second adders through a decoder. The coder comprises a zero correction signal sensing means, a group of AND gates and a group of OR gates. The inputs of the zero correction signal sensing means are respectively connected to the bit position lines of the outputs of the correction units. One input of each of the AND gates is connected to a corresponding line of said portion of the bit position line of the first output of the video signal source, while the other input of each of the AND gates is connected to the output of the zero correction signal sensing means. One input of each of the OR gates is connected to a corresponding output bit position line of the correction units, while the other input of each of the OR gates is connected to the output of a corresponding AND gate. The decoder comprises two groups of gates. The outputs of the gates of the first group are respectively connected to the bit position lines of the first inputs of the first and second adders. The outputs of the gates of the second group are respectively connected to the lines of said portion of the bit position lines of the second input of the comparison unit. One input of each of the gates of the first and second groups is connected through the communication channel to the output of the zero correction signal sensing means so that the inputs of the gates of one group are supplied with a signal inverted with respect to the signal supplied to the inputs of the gates of the other group. The other input of each of the gates of the second group is connected to the other input of a corresponding gate of the first group and through the communication channel to the output of a corresponding gate of the group of OR gates of the coder.

The aforementioned and other objects and advantages of the present invention will become more apparent upon consideration of the following detailed description of its preferred embodiments taken in conjunction with the accompanying drawings.

BRIEF DESCRIPTION OF THE DRAWINGS

FIG. 3 is a table which explains when and how half-tone dots are shifted;

FIGS. 4, FIG. 4a, FIG. 4b, FIG. 4c, FIG. 4d, and FIG. 4e, respectively are graphs illustrating shifting of half-tone dots in accordance with curves corresponding to variation of the half-tone function values and to variation of the reflectivities of the image unit areas;

FIGS. 5, FIG. 5a, FIG. 5b, FIG. 5c, FIG. 5d, and FIG. 5e, respectively are graphs illustrating shifting of half-tone dots in the case of a different relation between the size of receiving medium unit areas and the period of the half-tone function;

DETAILED DESCRIPTION OF THE INVENTION

Figure 1:
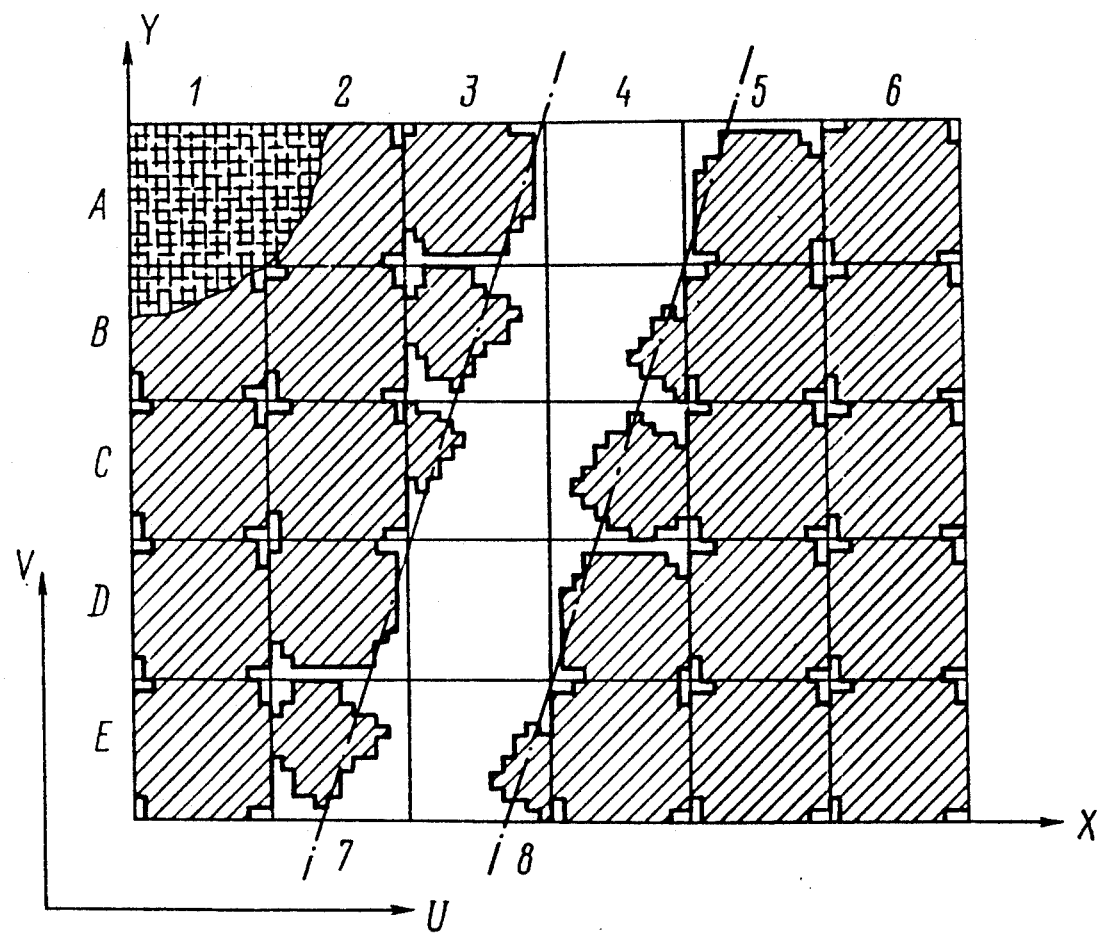
FIG. 1 shows the arrangement of half-tone dots on a portion of the surface of a receiving medium during reproduction of an image thereon according to the invention.

The method of making a half-tone reproduction of an image on a receiving medium includes generating signals corresponding to the reflectivities of the unit areas of the image to be reproduced. FIG. 1 shows a portion of the receiving medium on which the image is being reproduced and which is divided into square unit areas corresponding to said image unit areas. The unit areas of the receiving medium (as the respective unit areas of the image) form a rectangular grid shown in FIG. 1 by solid lines and having "rows", such as A, B, C, D and E, and "columns", such as 1, 2, 3, 4, 5 and 6. In such a case any unit area of the receiving medium can be designated by the row and column at the intersection of which it is located. Thus, at the intersection of the row C and the column 4 there is a unit area C4. Each receiving medium unit area is, in its turn, divided into 144 square elements forming a rectangular grid shown by dashed lines in the left upper corner of the grid of the unit areas. Each unit area of the receiving medium corresponds to a respective unit area of the reproduced image, the image unit areas being arranged in the same way as the respective unit areas of the receiving medium.

Two dash-and-dot lines 7 and 8 in FIG. 1 show the boundaries of dark portions of the image superimposed on the receiving medium so that the respective unit areas of the image and the receiving medium coincide. The dark portions of the image, i.e., the portions characterized by a small reflectivity, lie on the left of the line 7 and on the right of the line 8, while the space between the lines 7 and 8 represents a light portion of the image, i.e., a portion characterized by a great reflectivity.

To each element of each receiving medium unit area corresponds one of the values of a predetermined half-tone function, which is a two-dimensional periodic spatial function of two mutually orthogonal coordinates "x" and "y" of the elements constituting the receiving medium unit areas. The half-tone function has a plurality of repeating minimum and maximum values respectively following one another at intervals equal to the period of the half-tone function which uniformly varies with respect to the extremum values in the directions of axes X and Y. The proposed method includes, as does the known method, generating signals corresponding to the values of the half-tone function and comparing them with signals corresponding to the reflectivities of the image unit areas. According to the known method, an element of a receiving medium unit area corresponding to a given image unit area is formed in accordance with the results obtained by comparing the reflectivity of this image unit area and the half-tone function value determined by the coordinates of this element. An element of a receiving medium unit area is formed light when the half-tone function value determined by the coordinates of this element differs from the reflectivity of a corresponding image unit area in a predetermined sense, and dark when the half-tone function value determined by the coordinates of the element differs from the reflectivity of a corresponding image unit area in the opposite sense.

If a positive image is to be formed on the receiving medium, an element is formed light when the half-tone function value differs from the reflectivity in a negative sense, i.e., is smaller than the reflectivity, and dark when the half-tone function value differs from the reflectivity in a positive sense, i.e., is greater than the reflectivity. If a negative image is to be formed on the receiving medium, and element is formed light when the half-tone function value differs from the reflectivity in a positive sense, i.e., is greater than the reflectivity, and dark when the half-tone function value differs from the reflectivity in a negative sense, i.e. is smaller than the reflectivity. As a result, dark half-toned dots are formed on the receiving medium, each dot being constituted by an aggregation of dark elements. Each of these half-tone dots is approximately symmetric about an element corresponding to a maximum value of the half-tone function if a positive image is to be produced, and to a minimum value of the half-tone function if a negative image is to be produced. The size of each dot depends on the number of elements by which corresponding half-tone function values differ in a predetermined sense from the reflectivity. If a positive image is to be produced, the dots will have greater sizes for darker image unit areas and smaller sizes for lighter image unit areas. If a negative image is to be produced, a dot will having a greater size in a lighter image unit area. Such methods of making a half-tone reproduction of an image by using a half-tone function are well known.

Figure 2:
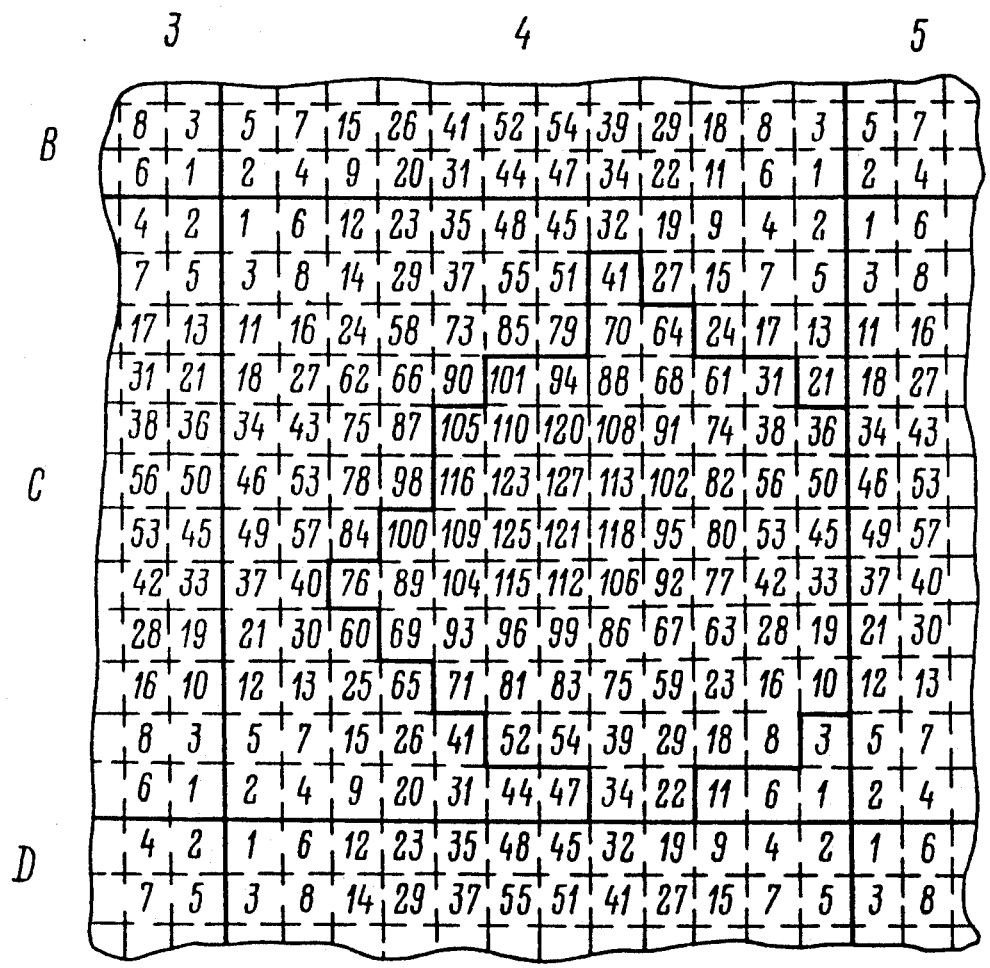
FIG. 2 illustrates formation of one of the half-tone dots shown in FIG. 1.

If the period of the half-tone function is equal to the repetition period of the receiving medium unit areas (although it is not necessarily so), the distribution pattern of half-tone function values will be the same for each of the receiving medium unit areas. The distribution pattern of half-tone function values may have in this case the appearance shown in FIG. 2. FIG. 2 shows the half-tone function values corresponding to the coordinates "x" and "y" of the elements of the unit area C4 shown in FIG. 1 and some of the elements of the unit areas B3, B4, B5, C3, C5, D3, D4 and D5 in the vicinity of the unit area C4. As can be seen in FIG. 2, the half-tone function values determined by the coordinates of the elements are the greatest in the middle of each unit area and become smaller as a boundary of a unit area is approached.

In distinction to known methods of making a half-tone reproduction of an image, the proposed method in certain cases envisages forming of a given element of a receiving medium unit area light or dark dependent upon the comparison between the reflectivity and the half-tone function value determined by the coordinates of another element of this unit area, which element is shifted with respect to the given element in a predetermined manner. To determine the necessity of such a shift, as well as its direction and degree, the proposed method envisages determining for each image unit area values characterizing variation of the reflectivity in the place of location of this unit area in two mutually opposite directions along each of two mutually perpendicular axes.

If the reflectivity in the place of location of a given unit area in both the mutually opposite directions along each of the axes does not vary in the same sense in which a half-tone function value should differ from a corresponding reflectivity value to form an element light, or vary in said directions in that sense to an equal degree, an element is formed light or dark dependent upon the comparison between the half-tone function value determined by the coordinates of this element and the reflectivity of a corresponding image unit area. In such a case there is no shift, and the element is formed in the same way as in the known method. In the case of production of a positive image, when, to form an element light, a corresponding half-tone function value should differ from a corresponding reflectivity value in a negative sense, there is no shift when the reflectivity does not vary in the above-mentioned opposite directions in a negative sense or varies in this sense in these directions to an equal degree, or, in other words, does not decrease (i.e., increases or remains constant) or decreases to an equal degree. In the case of production of a negative image, when to form a light element, a corresponding half-tone function value should differ from a corresponding reflectivity in a positive sense, there is no shift if the reflectivity does not vary in the above-mentioned mutually opposite directions in a positive sense or varies in this sense to an equal degree, in other words, does not decrease (i.e., increases or remains constant) or decreases to an equal degree.

However, if in anyone of the mutually opposite directions along any one of said two axes the reflectivity varies in the same sense in which a half-tone function value should differ from a corresponding reflectivity value to form an element light, while in the opposite direction the reflectivity varies in the same sense to a lesser degree or varies in the opposite sense, then each given element of the receiving medium unit area corresponding to a given image unit area is formed in a different way. In such a case the proposed method envisages determining the position of an element shifted with respect to the given element along such an axis in the direction of the lesser degree of variation of the reflectivity in the same sense in which a half-tone function value should differ from a corresponding reflectivity value to form an element light, or in the direction in which the reflectivity varies in the opposite sense. The degree of shift is the greater when the degree of variation of the reflectivity in the direction opposite to the direction of the shift is the greatest. In the case of production of a positive image it means that the shift occurs when the reflectivity in one direction decreases to a lesser degree than in the opposite direction or increase, and that the direction of the shift coincides with the direction in which the reflectivity decreases to a lesser degree or increases. In the case of production of a negative image it means that the shift occurs when the reflectivity in one direction increases to a lesser degree than in the opposite direction or decreases, and that the direction of the shift coincides with the direction in which the reflectivity increases to a lesser degree or decreases.

If the shifted element lies within the same unit area as does a given element, the latter is formed according to the result obtained by comparing the half-tone function values determined by the coordinates of the shifted element with the reflectivity of a corresponding unit area. In such a case the reflectivity of the element being formed depends on the result of comparison in the same way as was described above for the case corresponding to the absence of the shift. If the shifted element lies outside the unit area within which lies the given element, the latter is formed light.

It is obvious that determining a half-tone function value by the coordinates of an element shifted as described above is equivalent to shifting a half-tone function value in a direction opposite to the direction of the shift of the element. In other words, in the case of production of a positive (negative) image half-tone function values are shifted in the direction of decrease (increase) in the reflectivity of the image if the reflectivity in the opposite direction increases (decreases), and in the direction of a greater decrease (increase) in the reflectivity if it decreases (increases) in both the mutually opposite directions. Therefore, if a half-tone function value is shifted, it is always shifted towards a darker unit area on the receiving medium.

If the above-stated conditions for a shift are fulfilled along both said axes, it is necessary to determine the position of an element shifted along each of these axes, the direction and degree of the shift along each axis being determined as described above.

The values characterizing variation of reflectivity may be the differences between the reflectivity of a given image unit area and the reflectivity of each of four adjacent unit areas. Two of these adjacent unit areas adjoin this unit area on different sides and are disposed therewith along one of said two mutually perpendicular axes. The two other adjacent areas adjoin the same unit area on different sides and are disposed therewith along the other of said axes.

Thus, the reflectivity of the image unit area corresponding to the unit area C4 of the receiving medium in FIG. 1 is compared with the reflectivities of the image unit areas corresponding to the unit areas C3 and B4 adjoining the unit area C4 on opposite sides and being disposed therewith along an axis U, and to the unit areas C5 and D4 adjoining the unit area C4 on opposite sides and being disposed therewith along an axis V which is perpendicular to the axis U. The difference between the reflectivities of the unit areas C4 and C3 characterizes variation of reflectivity along the axis U, while the difference between the reflectivities of the unit areas C5 and C4 characterizes variation of reflectivity also along the axis U but in the opposite direction. The difference between the reflectivities of the unit areas B4 and C4 characterizes variation of reflectivity along the axis V, while the difference between the reflectivities of the unit areas C4 and D4 characterizes variation of reflectivity also along the axis V but in the opposite direction.

In the case of production of a positive image the coordinates determining values of the half-tone function in the unit area C4 are shifted towards the unit area C3 (which means that the half-tone function values are shifted towards the unit area C5) under the following conditions: the reflectivity of the unit area C5 is smaller than the reflectivity of the unit area C4; the reflectivity of the unit area C3 is greater than or equal to the reflectivity of the unit area C4, or the reflectivity of the unit area C3 is smaller than the reflectivity of the unit area C4 and the difference between the reflectivities of the unit areas C4 and C3 is smaller than the difference between the reflectivities of the unit areas C4 and C5. The degree of the shift will be the greater when the difference between the reflectivities of the unit areas C4 and C5 is the greatest. The conditions for a shift towards the unit areas C3, B4 and D4 will be similar, the degree of the shift towards the unit area C3 being likewise determined by the difference between the reflectivities of the unit areas C4 and C5, the degree of the shift towards the unit area B4 being determined by the difference between the reflectivities of the unit areas C4 and B4, while the degree of the shift towards the unit area D4 is determined by the difference between the reflectivities of the unit areas C4 and D4. If corresponding conditions are met, half-tone function values may be simultaneously shifted in two mutually perpendicular directions e.g., towards the unit area C5 (along the axis U) and towards the unit area D4 (along the axis V).

Since in the case of production of a positive image half-tone, dots are formed around the greater values of the half-tone function, the shifting of its values described above will lead to shifting of a corresponding half-tone dot towards image unit areas having smaller reflectivities, i.e., towards darker unit areas of the receiving medium. In the case of production of a negative image half-tone, dots are formed around the smaller values of the half-tone function so that a half-tone dot will be shifted towards image unit areas having a greater reflectivity, i.e., again towards darker unit areas of the receiving medium.

Shifting of a half-tone dot is explained with reference to the table shown in FIG. 3. The first column of the table includes the numbers of the table rows. The third column shows half-tone dots formed in a certain unit area N of the receiving medium and the direction of their shift if it occurs. The second and fourth columns show half-tone dots formed in the unit areas M and P adjoining the unit area N on opposite sides. The fifth column includes the relationships between the reflectivities $K_N$, $K_M$ and $K_P$ of the unit areas respectively corresponding to the unit areas M, N and P, for the case of production of a positive image; these relationships correspond to the half-tone dots shown in the same rows of the second, third and fourth columns. A half-tone dot is shifted when the reflectivities are related as shown in the rows 1-6 of the table. When the reflectivities are related as shown in the rows 7-12, there is no shift. The degree of shift is determined by the difference between the reflectivity of the unit area N and the reflectivity of that of the unit areas M and P towards which the corresponding half-tone dot is shifted.

Let us consider formation of a half-tone dot in the unit area C4 (FIG. 1) when a positive image is to be produced. If this unit area is intersected by the boundary of a dark portion of the image, as described above and shown in FIG. 1, the coordinates determining half-tone function values should be shifted towards the unit area C3 and towards the unit area B4 because the reflectivities of the unit areas C3 and B4 are greater than the reflectivity of the unit area C4, the reflectivity of the unit area C4 being, in its turn, greater than the reflectivities of the unit areas C5 and D4. Let us assume that the reflectivity of the unit area C4 has a value which is greater than 46 but smaller than 47. Let us also assume that the differences between the reflectivities of the unit areas C4 and C3 and between the reflectivities of the unit areas C4 and B4 have values at which each given element of the unit area C4 is formed according to the position of an element shifted with respect to the given element by two elements towards the unit area C3 and by one element towards the unit area B4. If the shifted element is within the unit area C4, the given element is formed dependent upon the comparison of the reflectivity of the unit area C4 and the half-tone function value determined by the coordinates of the shifted element, the given element being formed light if the half-tone function value corresponding to the coordinates of the shifted element is smaller than the reflectivity of the unit area incorporating the given element, and dark if the half-tone function value corresponding to the coordinates of the shifted element is greater than the reflectivity of this unit area. If the shifted element is outside the unit area C4 (e.g., falls within the unit area C3 or B4), the given element is formed light.

Referring to FIG. 2, the elements of the first row from the top and the elements of the first and second columns from the left of the unit area C4 are formed light because the elements shifted with respect thereto by two elements towards the unit area C3 and by one element towards the unit area B4 lie outside the unit area C4. The half-tone function value corresponding to the coordinates of the element which lies in the unit area C4 at the intersection of the fourth row from the top and the third column from the left is 62. However, this element is formed light because the reflectivity of the unit area C4 is compared not with this value of the half-tone function but with its value determined by the coordinates of the shifted element which lies at the intersection of the third row and the first column. As can be seen from FIG. 2, the half-tone function value corresponding to this element is 11, i.e., smaller than the reflectivity of the unit area C4. On the other hand, the element lying at the intersection of the second row from the bottom and the second column from the right is formed dark because the corresponding shifted element lies at the intersection of the third row from the bottom and the fourth column from the right and the half-tone function value corresponding to this shifted element is 59. The other elements of the unit area C4 are formed light or dark in a similar way, as a result of which the aggregation of dark elements constituting the half-tone dot in the unit area C4 will take the position shown in FIG. 2, the outline of the dot being shown by a solid line.

The position of the shifted half-tone dot in the unit area C4 is also shown in FIG. 1, the positions of the half-tone dots in other receiving medium unit areas for the case of production of a positive image being also shown in FIG. 3. As will be seen from FIG. 1, shifting of half-tone dots towards unit areas having a smaller reflectivity occurs in the unit areas D2, E2, A3, B3, C3, E3, B4, C4, D4 and A5 for which the above-stated conditions for shifting are fulfilled. As this takes place, the dots in the unit areas B4, C3 and E3 are respectively shifted horizontally towards the unit areas B5, C2 and E4 having smaller reflectivities than the unit areas B4, C3 and E3, respectively, but not towards the unit areas B3, C4 and E2 which also have smaller reflectivities than the unit areas B3, C4 and E3, respectively, since the difference between the reflectivities of the unit areas B4 and B5, C3 and C2, E3 and E4 are, respectively, greater than the differences between the reflectivities of the unit areas B4 and B3, C3 and C4, E3 and E2. In the other unit areas shown in FIG. 1, for which said conditions for shifting are not fulfilled, half-tone dots are not shifted because none of these other unit areas adjoins a unit area having a smaller reflectivity, i.e., a darker unit area. For each of these other unit areas its reflectivity is compared with the half-tone function values determined by the coordinates of the elements being formed, with the result that the centers of the half-tone dots will be in the centers of the unit areas. As will be easily seen from FIG. 1, as a result of the shift of half-tone dots as described above, the boundaries between the dark and light areas on the receiving medium become much more even in comparison with those which would have been if each half-tone dot had been formed around the central part of a corresponding unit area as is the case with the known methods of making a half-tone reproduction of an image.

FIG. 1 does not illustrate a case when the reflectivity of the unit area in which a half-tone dot is being formed exceeds by equal amounts the reflectivities of the two unit areas adjoining this unit areas on opposite sides thereof. In such a case the half-tone dot is not shifted because it is not on an image contour or in close proximity thereto.

Figure 4:
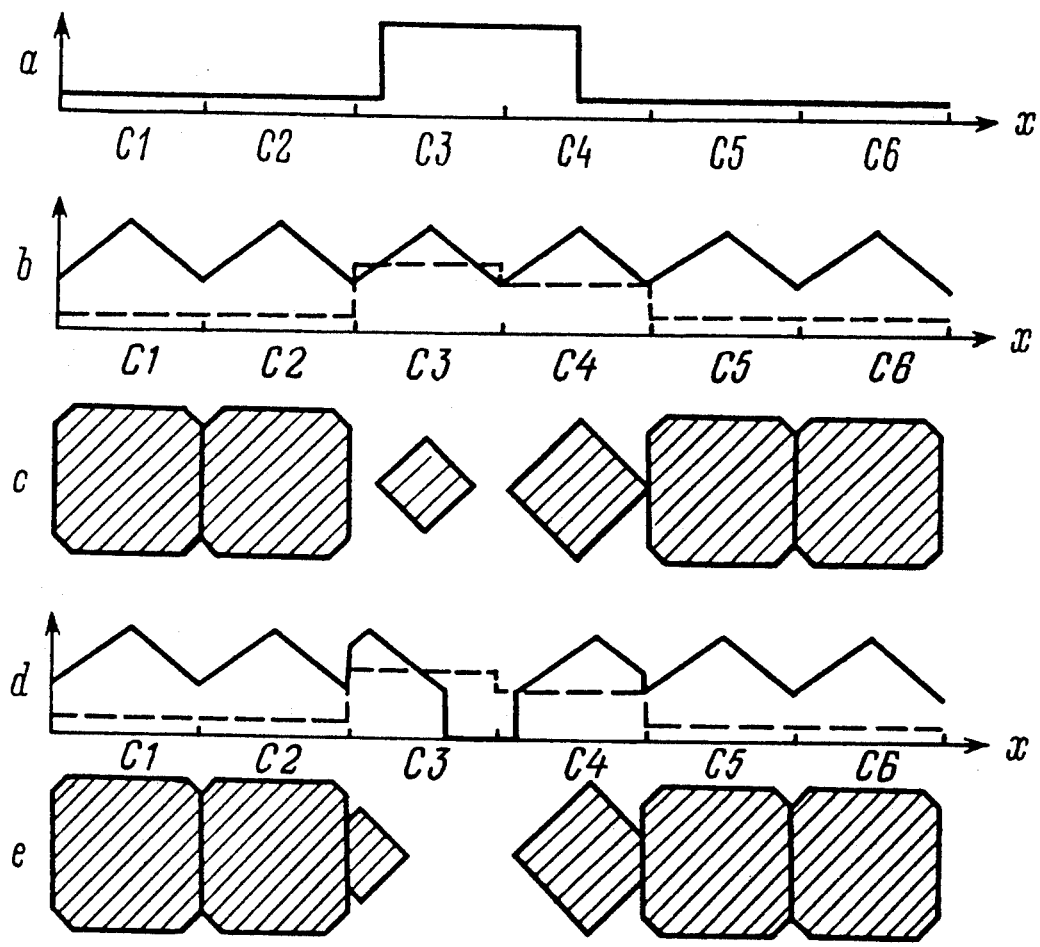

Shifting of a half-tone dot when a positive image is to be produced and the spatial period of the half-tone function equals the period of repetition of the receiving medium unit areas, i.e., the period with which the reflectivities of the image unit areas are determined, is explained also with reference to FIGS. 4(1-e). FIG. 4a shows variation of the image reflectivity along some line passing along the row C of the grid of unit areas shown in FIG. 1. In FIG. 4b the solid line shows variation of the half-tone function values along said line passing along the row C, and the dashed line shows variation of the image reflectivity measured separately for each of the unit areas C1, C2, C3, C4, C5 and C6. According to FIG. 4b, the reflectivity of the unit area C4 is greater than the reflectivities of the unit areas C1, C2, C5 and C6 but smaller than the reflectivity of the unit area C3, which corresponds to the disposition of the dark and light image areas in FIG. 1. If the image is reproduced according to the known method, a half-tone dot is formed with dark elements having coordinates corresponding to half-tone function values exceeding the reflectivity of a given unit area. The arrangement and the sizes of the half-tone dots in the unit areas C1–C6, in case the known method is employed, is shown in FIG. 4c (the shift of half-tone dots in a direction perpendicular to the row of unit areas is not shown in FIG. 4). In distinction to the known method, the proposed method, when corresponding conditions, as pointed out above, are fulfilled, envisages comparing the reflectivity with the half-tone function values corresponding to the coordinates shifted towards a darker unit area. Such a shift along the coordinate "x" takes place in the unit areas C3 and C4 and is shown is FIG. 4d. As can be seen from FIG. 4d, between the shifted half-tone function values there is an interval wherein the half-tone function can be considered to have a zero value because in this interval the shifted elements (which are shifted in directions opposite to the directions of shift of the half-tone function values) lie beyond the unit area incorporating the elements to be formed, which therefore must be formed light. The disposition of the half-tone dots obtained on the receiving medium is shown in FIG. 4e.

Figure 5:
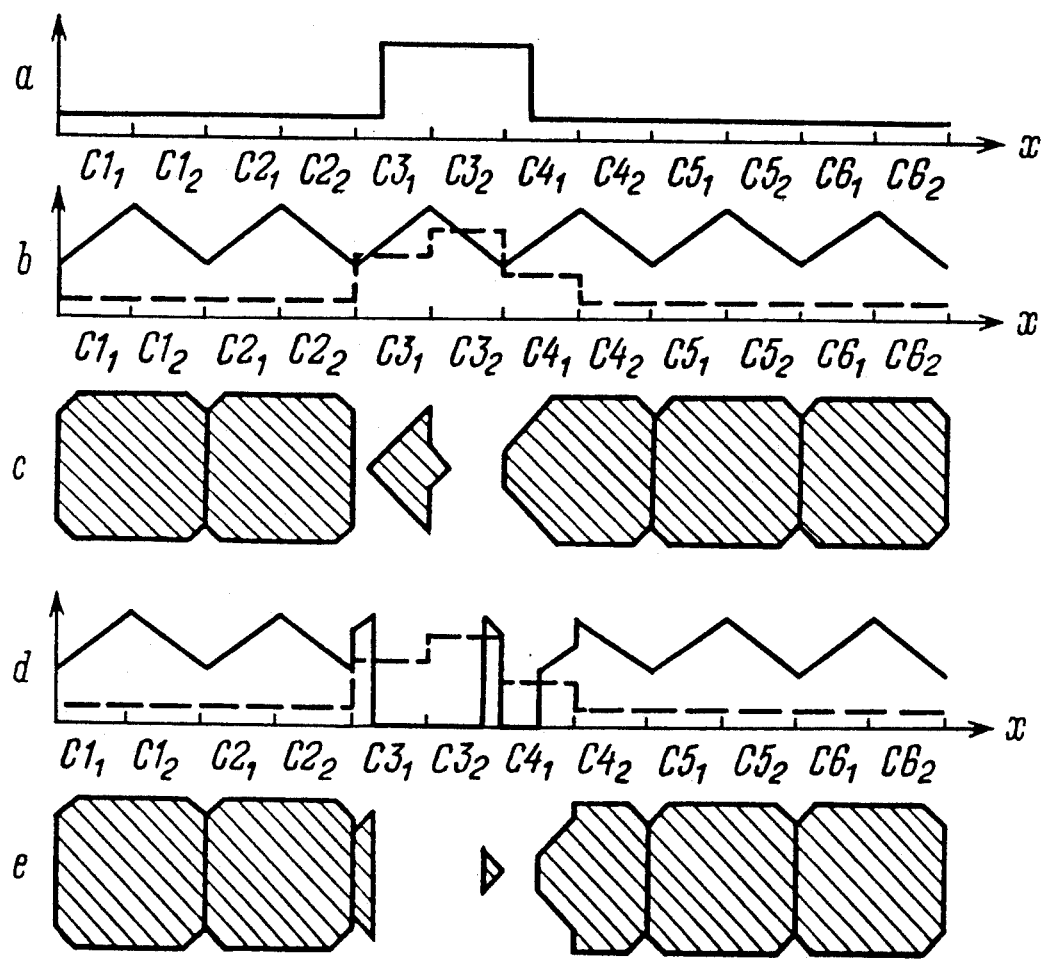

It is possible for different portions of a half-tone dot to move in opposite directions. This can occur, for example, when the period of a half-tone function does not coincide with or is greater than the repetition period of image unit areas where reflectivity is measured. Shifting of portions of a half-tone dot in opposite directions when the period of a half-tone function is twice as great as the repetition period of unit areas is illustrated in FIG. 5. FIGS. 5a, 5b and 5d show variations of the same values of FIGS. 4a, 4b and 4d, respectively, while FIGS. 5c and 5e show half-tone dots formed by the known and proposed methods, respectively. Comparing FIGS. 5c and 5e, it is easy to observe the "destruction" of a half-tone dot according to the proposed method (FIG. 5e) prevents "destruction" of a contour of an image with this dot in the known method (FIG. 5c).

It will be seen that, if the proposed method is used for producing a negative image, the half-tone dots in the unit areas D2, E2, A3, B3, C3, E3, B4, C4, D4 and A5 (FIG. 1) will be shifted towards the interval between the lines 7 and 8 (which interval in such a case must be dark on the receiving medium). For example, the coordinates determining half-tone function values when a half-tone dot is formed in the unit area C4 will be shifted towards the unit areas C5 and D4 because the reflectivities of the unit areas C5 and D4 are smaller than the reflectivity of the unit area C4, the reflectivity of the latter being, in turn, smaller than the reflectivities of the unit areas C3 and B4. As a result, the half-tone dot in the unit area C4 is shifted towards the unit areas C3 and B4, and so on.

According to another embodiment of the present invention, the values characterizing variation of reflectivity at the place of location of an image unit area can be the differences between the reflectivity of the whole unit area and the reflectivities of its portions. Two such portions can lie on different sides of a straight line which is parallel to one of two mutually perpendicular axes and passes through the middle of the unit areas, whereas two other portions can lie on different sides of a straight line which also passes through the middle of the unit area but is parallel to the other of said two mutually perpendicular axes. This embodiment is illustrated in FIG. 6.

Figure 6:
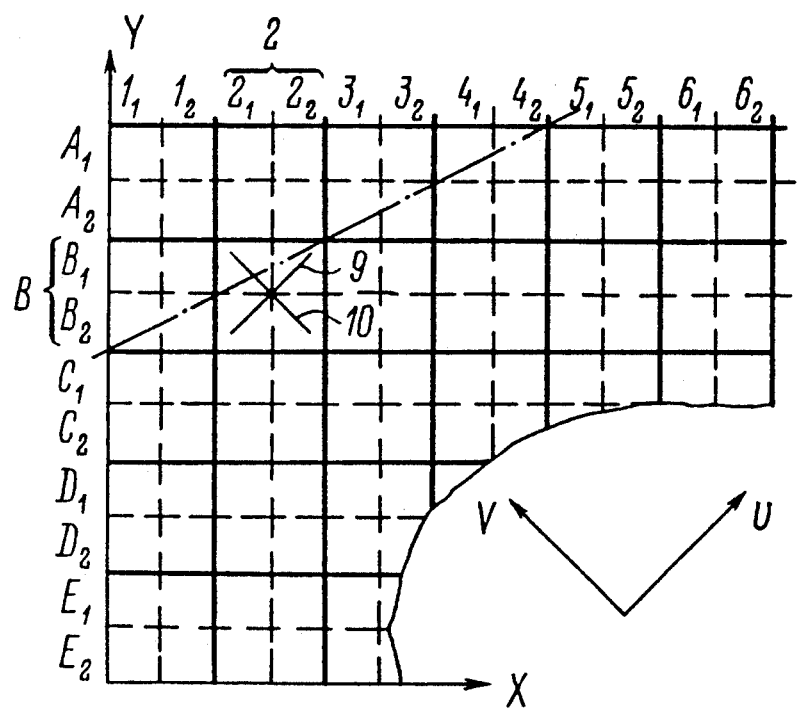
FIG. 6 is a graph illustrating the process of determining variation of the reflectivity of an image unit area from the difference between the reflectivities of its different portions.

Referring to FIG. 6, each of the image unit areas A1, A2, A3, A4, B1, ..., C4 is divided into four portions. For example, the unit area B2 is divided into portions $B_12_1$ and $B_22_2$ lying on different sides of a line 9 which passes through the middle of the unit area B2 parallel to the axis U, and portions $B_12_2$ and $B_22_1$ lying on different sides of a line 10 which passes through the middle of the unit area B2 parallel to an axis V which is perpendicular to the axis U. The difference between the reflectivity of the unit area B2 and the reflectivity of its portion $B_12_2$ characterizes the variation of reflectivity along the axis U in one direction, while the difference between the reflectivities of the unit area B2 and its portion $B_22_1$ characterizes the variation of reflectivity along the axis U in the opposite direction. Similarly, the differences between the reflectivities of the unit area B2 and its portions $B_12_1$ and $B_22_2$ characterize the variations of reflectivity along the axis V. The need for shifting the coordinates determining the half-tone function values and the direction of shift are determined according to the table shown in FIG. 3. For example, if it is necessary to determine the need for shifting half-tone function values along the axis U (FIG. 6) and the direction of such a shift, the unit areas N, M and P (FIG. 3) will be, respectively, the unit area B2 and its portions $B_22_1$ and $B_12_2$. The degree of the difference will be, as before, determined by the difference will be, as before, determined by the difference between the reflectivities of the unit area N and that of the unit areas M and P towards which the coordinates are shifted.

Thus, if the dash-and-dot line shown in FIG. 6 is an image contour above which lies a dark part of the image and below which lies a light part of the image, the half-tone dots formed in the unit areas B1, B2, A3 and A4 will be shifted according to the table of FIG. 3 upwards and to the right along the axis U and downwards and to the left along the axis V.

As shown in FIG. 6, the axes U and V can be inclined with respect to the directions of the rows and columns of the grid of the image unit areas. If the directions of the rows and columns of the elements in the corresponding receiving medium unit areas coincide with the directions of the rows and columns of the grid of unit areas, as in FIG. 1, the half-tone function is a periodic function of the coordinates "x" and "y" plotted along axes parallel to the rows and columns of the grid of unit areas, as shown in FIG. 6, and inclined with respect to the axes U and V. In such a case the half-tone function values will be shifted along the coordinates "x" and "y" by amounts which will be respectively determined as the sums of the projections of the shifts along the axes U and V on the axis X and the sum of the projections of the shifts along the axes U and V on the axis Y.

To increase the resolution of the method and obtain a higher quality of image reproduction, it is possible to take the values of the video signal which characterizes the reflectivity variations, at intervals smaller than the period of the half-tone function. For example, if the period of the half-tone function is the same as the period of repetition of the unit areas (such as B2) in FIG. 6, it will be twice as great as the intervals at which the video signal values are taken, i.e., the repetition period of the unit area portions (such as $B_1 1_1$, $B_2 1_1$, $B_1 1_2$ and $B_2 1_2$). In such a case the proposed method will respond to variation of reflectivity not only from one unit area to another but also from one portion of a unit area to another. In such a case, however, the amount of the data to be stored and/or transmitted over a communication channel will increase four times because, instead of the reflectivity of each unit area, the reflectivities of four of its portions must be stored.

Figure 7:
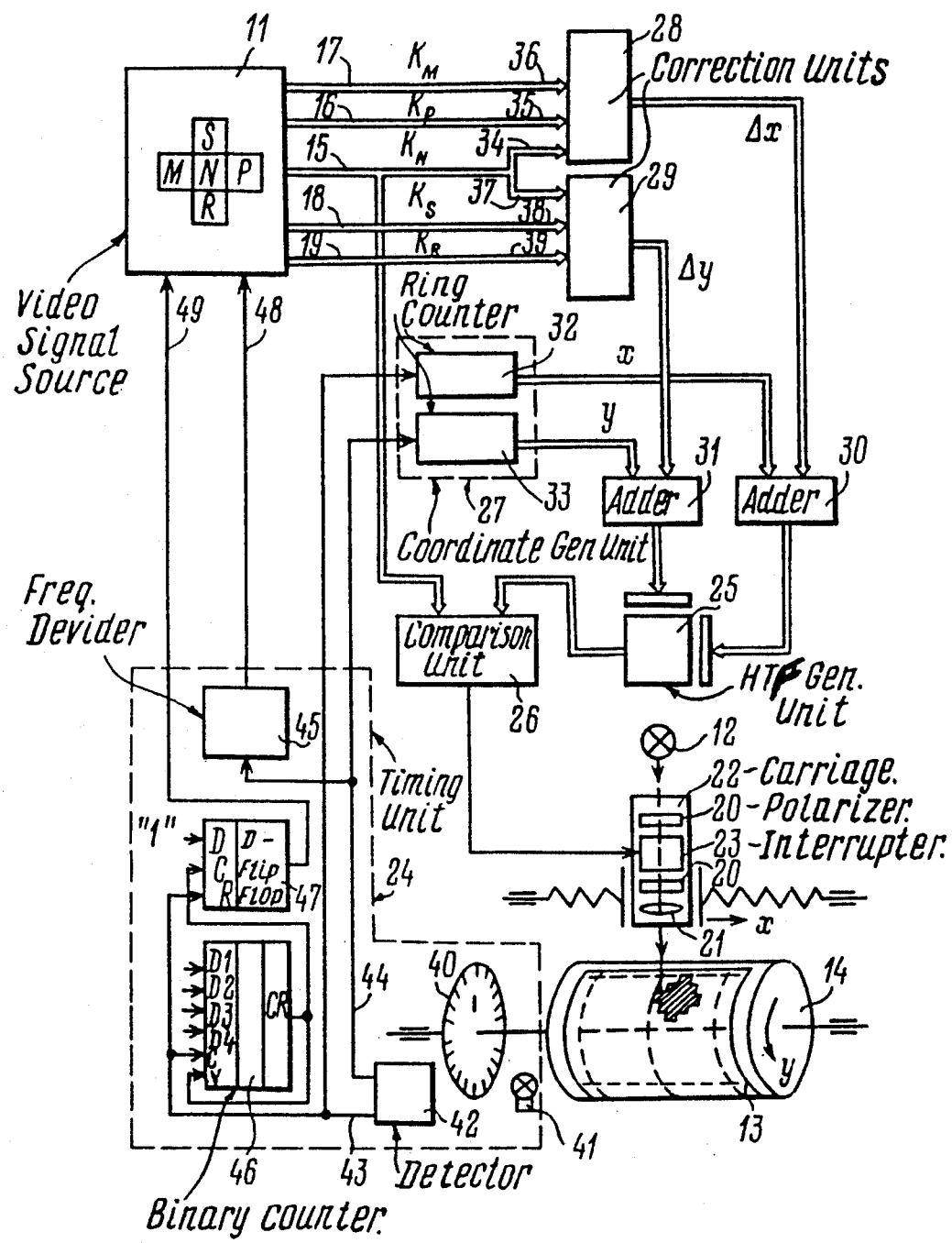
FIG. 7 is a block diagram of an apparatus for implement the method of making a half-tone reproduction of an image according to the invention.

The proposed method can be implemented by means of the apparatus shown in FIG. 7. Referring to FIG. 7, the apparatus for half-tone reproduction of an image on a receiving medium comprise a video signal source 11, a light source 12, and a means for directing the light beam of the light source 12 to a receiving medium 13 secured on a rotating drum 14.

The video signal source 11 has five outputs and sequentially develops at its output 15 the reflectivity values of the unit areas into which the image is divided. As this takes place, the video signal source 11 each time develops at its outputs 16 and 17, respectively, the reflectivity values of two image unit areas lying in the region of the unit area the reflectivity of which is being produced at the output 15, on different sides of a certain straight line passing through the middle of this unit area, and develops at its outputs 18 and 19, respectively the reflectivity values of two image unit areas lying in the region of the unit area the reflectivity of which is being produced at the output 15, on different sides of another straight line also passing through the middle of this unit area perpendicular to the first straight line.

The means for directing the light beam of the light source 12 to the receiving medium comprises two polarizers 20 and a lens 21, mounted on a carriage 22 which can move along the drum 14. A controlled beam interrupter 23 for interrupting the light beam produced by the light source 12 is mounted between the polarizers 20. The interrupter 23 is constituted by an electro-optic modulator.

The apparatus further comprises a timing unit 24, a half-tone function generating unit constituted by a read-only memory (ROM) 25, and a comparison unit 26 having its one input connected to the output 15 of the signal source 11, its other input connected to the output of the ROM 25 and its output connected to the control input of the beam interrupter 23. The ROM 25 contains the values of a half-tone function which, as mentioned above, is a periodic function of two coordinates of the elements into which the unit areas of the receiving medium 13 which correspond to the image unit areas are divided.

The apparatus further comprises a coordinate generating unit 27 for generating coordinates "x" and "y" of the elements of the receiving medium unit areas, a correction unit 28 for correcting the coordinate "x" of the elements of the receiving medium unit areas, a correction unit 29 for correcting the coordinate "y" of the elements of the receiving medium unit areas, and two adders 30 and 31. The coordinate generating unit 27 comprises two binary ring counters 32 and 33, the counting inputs of which are the inputs of the coordinate generating unit 27 and are connected to the timing unit 24, the outputs of the counters 32 and 33 forming, respectively, the "x" coordinate output and the "y" coordinate output of the unit 27. The inputs 34, 35 and 36 of the correction unit 28 are respectively connected to the outputs 15, 16 and 17 of the video signal source 11, while the inputs 37, 38 and 39 of the correction unit 29 are respectively connected to the outputs 15, 18 and 19 of the video signal source 11. The inputs of the adder 30 are respectively connected to the output of the counter 32 and to the output of the correction unit 28, while the inputs of the adder 31 are respectively connected to the output of the counter 33 and to the output of the correction unit 29. The output of the adder 30 is connected to the "x" coordinate address input of the ROM 25, while the output of the adder 31 is connected to the "y" coordinate address input of the ROM 25.

The timing unit 24 comprises a transparent disc 40 mounted on the shaft on which the drum 14 rotates. The disc 40 has a plurality of radial lines disposed at equal intervals along the circumference of the disc with the exception of a small sector where a single additional line shifted radially with respect to the other lines is provided. A light source 41 is installed on one side of the disc 40, while on the other side of this disc is a photoelectric detector 42 which senses the light beam produced by the light source 41. The photoelectric detector 42 has two outputs puts 43 and 44 for generating pulses thereat. Pulses at the output 43 are produced when the additional (shifted) line on the disc 40 is in the path of the light beam of the light source 41, i.e., after each complete revolution of the drum 14. Pulses at the output 44 are produced when any one of the other lines are in the path of the light beam, i.e., during the intervals between the instants of appearance of pulses at the output 43. The outputs 43 and 44 of the photoelectric detector 42 form two outputs of the timing unit 24 and are respectively connected to the counting inputs of the counters 32 and 33 of the coordinate generating unit 27.

The timing unit 24 further comprises a frequency divider 45 having its input connected to the output 44 of the photoelectric detector 42, a binary counter 46 and a D-flip-flop 47. The counting input C of the counter 46 and the reset input R of the flip-flop 47 are connected to the output 43 of the photoelectric detector 42, while the inverse carry output CR of the counter 46 is connected to its data storage enable input V and to the clock input C of the flip-flop 47. The data inputs D1, D2, D3 and D4 of the counter 46 are supplied with a binary code which depends on the period of variation of the half-tone function along the axis X. The data input D of the flip-flop 47 is supplied with a signal of logic one. The output of the frequency divider 456 forms a third output of the timing unit 24 and is connected to a control input 48 of the video signal source, while the output of the flip-flop 47 forms a fourth output of the timing unit 24 and is connected to another control input 49 of the video signal source 11.

Figure 8:
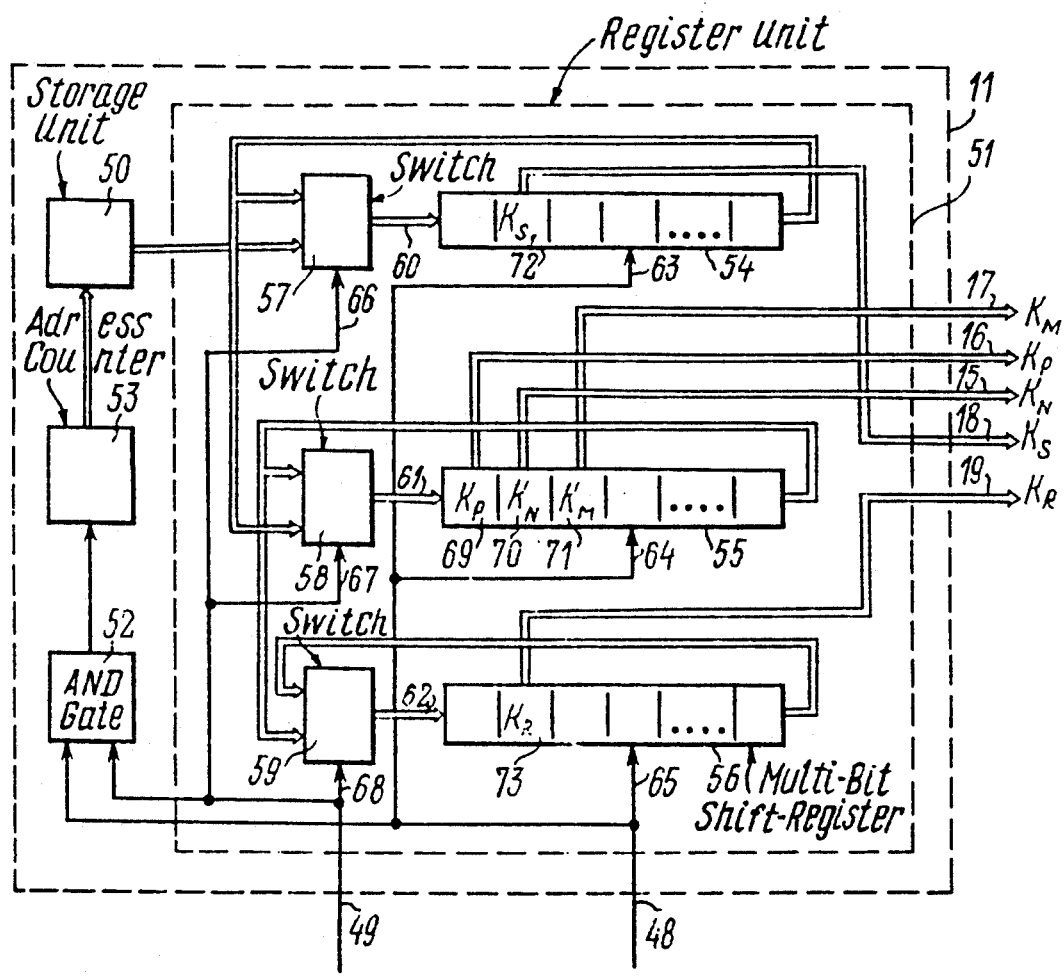
FIG. 8 is a block diagram of the video signal source employed in the apparatus shown in FIG. 7.

The block diagram of the video signal source 11 is shown in FIG. 8. Referring to FIG. 8, the video signal source 11 comprises a storage device 50, a register unit 51, an AND gate 52, and an address counter 53 having its counting input connected to the output of the AND gate 52 and its output connected to the address input of the storage device 50. The register unit 51 comprises three multibit shift registers 54, 55 and 56 and three electronic switches 57, 58 and 59. The data input 60 of the register 54 is connected through the switch 57 to the output of this register and to the output of the storage device 50. The data input 61 of the register 55 through the switch 58 is connected to the output of this register and to the output of the register 54. The data input 62 of the register 56 is connected to the output of this register and to the output of the register 55. The control inputs 63, 64 and 65 of the registers 54, 55 and 56 and connected to one another and to one of the inputs of the AND gate 52, forming the control input 48 of the video signal source 11. The control inputs 66, 67 and 68 of the switches 57, 58 and 59 are connected to one another and to another input of the AND gate 52, forming the control input 49 of the video signal source 11. The switches 57 and 59 are connected so that, depending on the signal at the control input 49, the inputs of the registers 54, 55 and 56 are respectively connected to the outputs of these registers or, respectively, to the output of the storage device 50, the output of the register 54 and the output of the register 55.

Each of the registers 54–56 comprises a plurality of multibit storage locations, the number of which is equal to the number of image unit areas incorporating the elements formed on the receiving medium 13 during one revolution of the drum 14.

The output of the first (input) storage location 69 of the register 55 is the output 16 of the video signal source 11, while the outputs of the next two storage location, i.e., the second storage location 70 and the third storage location 71 are, respectively, the outputs 15 and 17 of the video signal source 11. The outputs 18 and 19 of the video source 11 are respectively constituted by the outputs of the second storage location 72 of the register 54 and of the second storage location 73 of the register 56.

The image reproducing apparatus shown in FIGS. 7 and 8 operates as follows.

During reproduction of an image the drum 14 rotates together with the receiving medium 13, while the carriage 22 moves along the axis of rotation of the drum 14. The image to be reproduced is divided into unit areas which form a rectangular grid, and the reflectivities of these unit areas are stored in the storage divide 50 (FIG. 8) of the video signal source 11 in such a way that they can be subsequently extracted in a required sequence by application of pulses to the address counter 53. The elements of the unit areas on the receiving medium 13 (FIG. 7) by means of the light source 12 and the modulator 23 are formed dark or light dependent on the data supplied from the video signal source 11, as will be described in more detail below.

One of the coordinates of an element being formed on the receiving medium 13, viz., the coordinate "x", is determined by the angle of rotation of the drum 14, while the other coordinate of this element, viz., the coordinate "y", is determined by the amount of displacement of the carriage 22. The directions of rotation of the drum 14 and movement of the carriage 22 are respectively shown by arrows "x" and "y" in FIG. 7. The angular distance between adjacent elements formed on the receiving medium 13 is equal to the angular distance between adjacent lines on the disc 40, i.e., the total number of elements formed during one revolution of the drum 14 is equal to the number of lines on the disc 40 (excluding the shifted line).

Let the rows and columns in the grid of the receiving medium unit areas corresponding to the image unit areas be respectively disposed along the circumference of the drum 14 and the axis of its rotation, the number of unit areas incorporating the element formed during one revolution of the drum 14, being equal to "n" and each of such unit areas consisting of $m^2$ elements forming a rectangular grid of $m \times m$ elements. In such a case the division ratio of the frequency divider 45 is set equal to the "m" and the number of lines on the disc 40 should be $m \times n$.

The data inputs D1–D4 of the counter 46 of the timing unit 24 are supplied with a binary code corresponding to the number "m", which is stored into the counter 46 upon arrival of an overflow signal from its carry output CR at its data storage enable input V. Then each pulse coming from the output 43 of the photoelectric detector 42 to the counting input C of the counter 46 when the shifted line on the disc 40 is in the path of the light beam of the source 41, i.e., after each complete revolution of the drum 14, decreases the contents of the counter 46 by one. After "m−1" revolutions of the drum 14 the number in the counter 46 becomes zero, and, after one more (the "m"th) revolution of the drum 14, the counter 46 overflows and develops at its carry output CR a pulse the front edge of which, appearing at the input V, causes the number "m" to be stored again into the counter 46. The trailing edge of this pulse, appearing at the clock input C of the flip-flop 47 having its data input constantly supplied with a logic one, causes this flip-flop to be set to the one state.

The arrival of a signal of logic one from the flip-flop 47 at the control inputs 66, 67 and 68 of the switches 57, 58 and 59 (FIG. 8) causes them to switch to a position at which the data inputs 60, 61 and 62 of the registers 54, 55 and 56 are respectively connected to the output of the storage device 50, to the output of the register 54 and to the output of the register 55. The signal of logic one from the flip-flop 47 (FIG. 7) is also applied to the input of the AND gate 52 (FIG. 8). During subsequent rotation of the drum 14 the pulses from the output 44 of the photoelectric detector 42 (FIG. 7) caused by the lines of the disc 40 (corresponding to the next-in-turn elements to be found in the path of the light beam from the source 12) come to the input of the frequency divider 45. Upon arrival of each "m"th pulse at the frequency divider 45 the latter develops at its output a pulse applied to the control inputs 63–65 of the registers 54–56 (FIG. 8) and to the other input of the AND gate 52. As this takes place, the address counter 53 increases its count by one and the data input 60 of the register 54 is supplied through the switch 57 with the reflectivity value of the next image unit area. This reflectivity value is stored into the input storage location of the register 54, while the input storage locations of the registers 55 and 56 are stored with the reflectivity values which were stored, respectively, in the input storage locations of the registers 55 and 56. The remaining reflectivity values are shifted in the registers 54–56 by one storage location from input to output. As this takes place, the reflectivity value that was stored in the output storage location of the register 56 is lost.

As pointed out above, the number of storage locations in each of the registers 54–56 is equal to the number "n" of the unit areas incorporating the elements formed in one revolution of the drum 14 (FIG. 7). The reflectivity values of the image unit areas are extracted from the storage device 50 (FIG. 8) in the same sequence as that in which the respective unit areas of the receiving medium 13 (FIG. 7) move with respect to the light beam of the source 12, so that the input storage location of the register 54 (FIG. 8) is stored with the reflectivity of the unit area on which the light beam of the source 12 (FIG. 7) will fall after passing through all the elements of "n+1" unit areas, i.e., after $m \times n$ revolutions of the drum 14 and the subsequent passage of the light beam through one more unit area. Under these conditions the second storage location 70 of the register 55 (FIG. 8) will contain the reflectivity $K_N$ of the unit area N to which the light beam from the source 12 is being directed at a given instant, the first storage location 69 and the third storage location 71 of this register will respectively contain the reflectivities $K_P$ and $K_M$ of the unit areas P and M adjoining the unit area N on opposite sides and being in the same row as the unit area N, the storage location 73 of the register 56 will contain the reflectivity $K_R$ of the unit area R adjoining the unit area N and being located in the preceding row, while the second storage location 72 of the register 54 will contain the reflectivity $K_S$ of the unit area S adjoining the unit area N on the other side and being located in the next row.

The pulses produced at the output 43 of the photoelectric detector 42 (FIG. 7) when the light beam from the source 41 falls on the shifted line of the disc 40 are applied also to the counting input of the counter 32, while the pulses produced at the output 44 of the photoelectric detector 42 (FIG. 7) are applied to the counting input of the counter 33. If the period of the half-tone function is "m" elements, i.e., equals the repetition period of the unit areas, the counter 32 is reset to its initial state on application thereto from the output 43 of the photoelectric detector 42 of each "m"th pulse, which pulse causes the counter 46 to overflow and the input storage locations of the registers 54, 55 and 56 (FIG. 8) to be connected, respectively, to the storage device 50, to the register 54 and to the register 55. The counter 33 in this case reset to its initial state also upon application thereto of each "m"th pulse, including the pulse produced at the output 44 of the photoelectric detector 40 as a result of falling of the light beam from the source 41 on the first line on the disc 40 following the shifted line. In the initial state the contents of the counter 32 is one. The contents of the counter 33 in its initial state is also one. The pulses at the output of the frequency divider 45 are produced simultaneously with the pulses which reset the counter 33 (FIG. 7) to its initial state. The contents of the counter 32 change each time the light beam from the source 41 falls on the shifted line on the disc 40 (i.e., after each revolution of the disc 40), which corresponds to a change in the number of the row incorporating the element being formed on the receiving medium 13, i.e., to a change in the coordinate "x" of the element. The contents of the counter 33 change each time the light beam from the source 41 falls on each of the other lines on the disc 40, which corresponds to a change in the number of the column incorporating the element being formed on the receiving medium 13, i.e., to a change in the coordinate "y" of the element. Thus, each of the "x" and "y" coordinate values at the outputs of the counters 32 and 33 represents a value reckoned from a corresponding border of a corresponding receiving medium unit area and from the beginning of a corresponding period of the half-tone function. These values therefore represent, respectively, the row and column numbers of elements in the unit areas and repeat with a period equal to the period of the half-tone function (to the repetition period of the unit areas).

The values of the coordinate "x" is applied from the output of the counter 32 to the adder 30 where it is summed with a correction $\Delta x$ produced in the correction unit 28. The value of a correction $\Delta x$ depends on the relation between the reflectivity $K_N$ of the unit area N and the reflectivities $K_M$ and $K_P$ of the unit areas M and P adjoining the unit area N on opposite sides and being in the same row as the unit area N. The reflectivities $K_M$, $K_N$ and $K_P$, respectively stored in the storage locations 71, 70 and 69 of the register 55 (FIG. 8), are respectively applied from the outputs 17, 15 and 16 of the video signal source 11 (FIG. 7) to the inputs 36, 34 and 35 of the correction unit 28. The correction unit 28 develops at its output a signal having a sign which depends on the sign of the difference between the signals at its inputs 35 and 36, and a value which is a direct function of the difference between the signal at the input 34 and that of the signals at the inputs 35 and 36 which differs from the other of the signals at these two inputs in a predetermined sense, provided that the signal at the input 34 differs from at least one of the signals at the inputs 35 and 36 in the same sense and the signals at the inputs 25 and 26 are different. In all of the other cases the correction unit 28 develops at its output a zero signal (in the general case it can be a constant signal corresponding to a zero correction).

If a positive image is to be produced on the receiving medium 13, a correction signal depending on the reflectivities of adjacent unit areas is produced at the output of the correction unit 28 when the signal at the input 34 exceeds at least one of the unequal signals at the inputs 35 and 36. This correction signal has a value determined by the difference between the signal at the input 34 and the greatest of the signals at the inputs 35 and 36. If a negative image is to be produced on the receiving medium 13, a correction signal depending on the reflectivities of adjacent unit ares is produced at the output of the correction unit 28 when the signal at the input 34 is smaller than at least one of the unequal signals at the inputs 35 and 36. This correction signal has a value determined by the difference between the signal at the input 34 and the smallest of the signals at the inputs 35 and 36. If a positive image is to be produced on the receiving medium 13 and the relation between the reflectivities $K_M$, $K_N$ and $K_P$ corresponds to the row 1, 3, or 5 of the table of FIG. 3, the correction $\Delta x$ has a negative sign and a value proportional to the difference between the reflectivities of the unit areas N and P. IF the relation between the reflectivities $K_M$, $K_N$ and $K_P$ corresponds to the row 2, 4 or 6 of this table, the correction $\Delta x$ has a positive sign and a value proportional to the difference between the reflectivities of the unit areas M and N. If the relation between the reflectivities $K_M$, $K_N$ and $K_P$ corresponds to one of the rows 7-12 of the table, the correction $\Delta x$ in the case of production of a positive image is zero. A correction $\Delta x$ can be determined according to the table of FIG. 3 as described above also in the case of production of a negative image if the signs of the inequalities in the fifth column of the table are reversed. The value of the coordinate "y" is applied from the counter 33 to the adder 31 where it is summed with a correction $\Delta y$ produced in the correction unit 29. The value of a correction $\Delta y$ depends on the relation between the reflectivity $K_N$ of the unit area N and the reflectivities $K_R$ and $K_S$ of the unit areas R and S also adjoining the unit area N on opposite sides but being located, respectively, in the preceding row and in the next row. The reflectivities $K_N$, $K_R$ and $K_S$, respectively stored in the storage location 70 of the register 55 (FIG. 8), in the storage location 73 of the register 56 and in the storage location 72 of the register 54, are respectively supplied from the outputs 15, 19 and 18 of the video signal source 11 (FIG. 7) to the inputs 37, 39 and 39 of the correction unit 29. The correction unit 29 operates in the same way as the correction unit 28, i.e., the signal at the output of the correction unit 28, i.e., the signal at the output of the correction unit 29 depends on the signals at its inputs 37, 38 and 39 in the same way as the signal at the output of the correction unit 28 depends on the signals, respectively, at its inputs 34, 35 and 36. The value and sign of a correction $\Delta y$ are determined as described above for the correction $\Delta x$, provided that the symbols M and P in the table of FIG. 3 are respectively substituted by R and S.

The operation of the correction units 28 and 29 will be described in detail below.

The sum of the values of the coordinate "x" and of a correction $\Delta x$ is applied from the adder 30 to the "x" coordinate address input of the ROM 25, while the sum of the values of the coordinate "y" and of a correction $\Delta y$ is applied from the output of the adder 31 to the "y" coordinate address input of the ROM 25. According to the values of said sums the ROM 25 generates a half-tone function value determined by coordinates $x+66$ x and $y+\Delta y$. Instead of the ROM 25 it is possible to use a device calculating half-tone function values from the two values applied thereto from the adders 30 and 31.

The half-tone function value supplied from the ROM 25 is compared in the comparison unit 26 with the reflectivity $K_N$ of the unit area N supplied from the output 15 of the video signal source 11. The signal from the output of the comparison unit 26 controls the optical modulator 23. If the half-tone function value applied to the comparison unit 26 exceeds the reflectivity $K_N$, the light beam from the source 12 passes through the modulator 23 and illuminates a corresponding element of a unit area on the receiving medium 13, with the result that this element is formed dark. If this half-tone function value is smaller than the reflectivity $K_N$, the modulator 23 interrupts the light beam from the source 12 preventing it from falling on a corresponding element of a unit area on the receiving medium 13, with the result that this element is not illuminated, i.e. formed light.

The formation of corrections $\Delta x$ and $\Delta y$ as described above provides shifting of the coordinates determining a half-tone function value with respect to the coordinates produced at the outputs of the counters 32 and 33 in case of fulfilment of the conditions pointed out in the rows 1-6 of the table of FIG. 3 or similar conditions obtained when the symbols N and P are respectively substituted by R and S or when the signs in the inequalities are reversed in the case of production of a negative image. Since in the case of production of a positive image correction $\Delta x$ and $\Delta y$ have negative signs when the unit area P following the unit area N and the unit areas located in the next row, respectively, have the smallest reflectivities, and positive signs when the preceding unit area M and the unit area R located in the preceding row, respectively, have the smallest reflectivities, the shift along the coordinate "x", as well as along the coordinate "y", always occurs in a direction opposite to the unit area having the smallest reflectivity. As pointed out above, in the description of the proposed method, such a shift of coordinates leads to a shift of a corresponding half-tone dot towards a darker unit area (having a smaller reflectivity) as required according to the proposed method. If a negative image is to be produced and the signs of corrections $\Delta x$ and $\Delta y$ are chosen as stated above, a corresponding half-tone dot will be shifted towards a unit area having a greater reflectivity which unit area will in this case also correspond to a darker unit area on the receiving medium. If one of the sums $x+\Delta x$ or $y+\Delta y$ is less than zero or exceeds "m", this means that the element having coordinates $x+\Delta x$ and $y+\Delta y$ lies beyond the unit area N. In this case the ROM 25 develops at its output a zero signal to form a corresponding element of a unit area on the receiving medium 13 light.

The receiving medium 13 is laid on the drum 14 in such a way that, when the light beam from the source 41 falls on the first line of the disc 40 following the shifted line, the light beam from the source 12 falls on the beginning of an extreme unit area located at one of the edges of the receiving medium 13 running along the axis of the drum 14, and, when the light beam from the source 41 falls on the "mn"th line (which is followed by the shifted line), the light beam from the source 12 falls on the end of an extreme unit area located at the opposite edge of the receiving medium 13.

If at the instant of falling of the light beam from the source 41 (FIG. 7) on the shifted line the counter 46 overflows and the counter 32 is reset, then at the instant of falling of the light beam from the source 41 on the first line following the shifted line during the subsequent rotation of the drum 14, the contents of the counter 32, as well as of the counter 33, will be one (when the light beam from the source 41 falls on the first line, the counter 33 is reset). Then the first element of the first row of elements in an extreme unit area is formed. This element has coordinates $x=1$ and $y=1$ and this unit area is the first unit area of a certain "i"th row of unit areas on the receiving medium 13. Upon appearance of a pulse at the output of the frequency divider 45 (at the instant the counter 33 is reset) the input storage location of the register 43 (FIG. 8) is stored from the storage device 59 with the next-in-turn reflectivity value (viz., the reflectivity of the second unit area of the "i+1"th row of unit areas) and the value stored in the other storage locations of the registers 54–56 are shifted one step, as a result of which the storage location 70 of the register 55 is stored with the reflectivity value corresponding to the extreme unit area the first element of which is to be formed on the receiving medium 13 (FIG. 7).

In subsequent rotation of the drum 14, when the light beam of the source 41 falls on the next (the second) disc line, the counter 33 increases its count by one and the second element of the first row in the same unit area, i.e., the element with coordinates $x=1$ and $y=2$, is formed on the receiving medium 13. When the light beam from the source 41 (FIG. 7) falls on the "m"th disc line, the element with coordinates $x=1$, and $y=m$, i.e., the last element of the first row in the extreme unit area, is formed on the receiving medium 13. When the light beam from the source 41 falls on the next, "m+1" line, the counter 33 is reset to the initial state. Simultaneously the frequency divider 45 develops at its output a pulse causing the next-in-turn reflectivity value to be stored into the input storage location of the register 54 (FIG. 8) and the reflectivity values stored in the other storage locations of the registers 54–56 to be shifted one step. As a result of this shift, the storage location 70 is stored with the reflectivity of the second unit area of the "i"th row of unit areas, the storage locations 69 and 71 are respectively stored with the reflectivities of the third unit area and the first unit area of the same row, the storage location 72 is stored with the reflectivity of the second unit area of the next, i.e. the "i+1"th, row, and the storage location 73 is stored with the reflectivity of the second unit area of the preceding, i.e. the "i=1"th, row. After the counter 33 (FIG. 7) is reset, its contents is one and the first element in the first row of elements of the second unit area in the "i"th row of unit areas is formed on the receiving medium 13.

Thereupon after the passage of the light beam from the source 41 through every "m" lines, the counter 33 is reset to one, the storage location 69 (FIG. 8) is stored with the reflectivity of the next-in-turn unit area, the storage locations 70-73 are stored with the reflectivities of the unit areas adjoining the unit area the reflectivity of which is stored in the storage location 69, and the elements of the first row in this unit area are formed on the receiving medium 13 (FIG. 7).

By the time the elements of the last, "n"th, unit area of the "i"th row of unit areas being to be formed, the storage location 69 of the register 55 (FIG. 8) will be stored with the reflectivity of the first unit area of the next, "i+1"th, row, the last storage location of the register 55 will be stored with the reflectivity of the second unit area of the "i"th row, while the reflectivity of the first unit area of the "i"th row will be stored in the input storage location of the register 56. The reflectivity value of the first unit area of the "i+1"th row appears at the input 35 of the correction unit 28 (FIG. 7) but dopes not affect the formation of the elements of the last unit area. This is due to the fact that several unit areas located in the beginning and at the end of each row of unit areas, i.e., the unit areas of several columns located at the edges of the receiving medium 13, are always formed light. For this purpose the reflectivity values corresponding to these unit areas and stored in the storage device 50 (FIG. 8) have a value exceeding the greatest value of the half-tone function.

The last element of the first row of elements in the last unit area of the "i"th row of unit areas is formed when the light beam from the source 41 (FIG. 7) falls on the last, "mn"th, line on the disc 40 followed by the shifted line. When the light beam from the source 41 then falls on the shifted line, the photoelectric detector 42 develops at its output 43 a pulse which is applied to the counter 46 and the reset input R of the flip-flop 47. The contents of the counter 46 becomes one, and the zero signal from the output of the flip-flop 47 comes to the AND gate 52 (FIG. 8), suspending the application of pulses to the address input of the storage device 50. The zero signal from the output of the flip-flop 47 is also applied to the control inputs 66-68 of the switches 57-59 and switches them to the positions at which the data inputs 60, 61 and 62 of the registers 54, 55 and 56 are respectively connected to their own outputs. The pulse from the output 43 of the photoelectric detector 42 is also applied to the counter 32, as a result of which the latter increases its count to two.

When the light beam from the source 41 then falls on the first disc line following the shifted line, the counter 33 is reset and the frequency divider 45 develops at its output a pulse causing the reflectivity values stored in the registers 54-56 (FIG. 8) to shift. As a result of this shift, the input storage location of each register is stored with the contents of its output storage location, while the values stored in each register are shifted from its input to its output. Therefore, when the light beam falls on the first disc line, the storage location 71 is stored with the reflectivity of the "m"th unit area of the "i"th row of unit areas, the storage location 71 is stored with the reflectivity of the first unit area of the "i+1"th row, the storage location 69 is stored with the reflectivity of the second unit area of the "i"th row, the storage location 72 is stored with the reflectivity of the first unit area of the "i−2"th row, and the storage location 73 is stored with the reflectivity of the first unit area of the "i"th row. The input storage locations of the registers 48 and 50 are stored with the reflectivities of the second unit areas of the "i+1"th, "i"th and "i−1"th rows, respectively, while the output storage locations of the registers 54, 55 and 56 are stored with the reflectivities of the third unit areas of the "i+1"th, "i"th and "i−1"th row, respectively. The contents of the counter 33 (FIG. 7) is one, the contents of the counter 32 is two, and the first element of the second row of elements in the first unit area of the "i"th row of unit areas is formed on the receiving medium 13. This unit area, as pointed out above, is always formed light.

When the light beam falls on the "m"th disc line, the values stored in the registers 54-56 (FIG. 8) are shifted another step, and the elements of the second row of elements in the second unit area of the "i−1"th row of unit areas are formed on the receiving medium. This unit area is also formed wholly light so that the reflectivity value of the first unit area of the "i+1"th row stored in the storage location 71 does not affect the signal developed by the comparison unit 26 when the elements of the second unit area are formed. The elements of the third unit area, after falling of the light beam on the ¢2m"th disc line, can already be formed in accordance with the signals at the outputs 15-19 of the video signal source because the storage locations 69, 70 and 71 will then contain, respectively, the reflectivities of the fourth, third and second unit areas of the "i"th row, while the storage locations 72 and 73 will contain, respectively, the reflectivities of the third unit areas of the "i+1"th and "i−1" th rows. The elements of the fourth and subsequent unit areas of the "i"th row, with the exception of the last ("n"th) unit area, can be also formed according to the signals at the outputs 15-19 of the video signal source 11.

The elements of the third, fourth and subsequent rows of elements in the unit areas of the "i"th row are formed in a similar way. When the elements of each of these rows begin to be formed, the contents of the registers 54-56 turn out to be the same as in the beginning of formation of the elements in the second row. Appearance of a pulse on the output 43 of the photoelectric detector 42 (FIG. 7) at the time of transition to each new row of elements causes the counter 32 and the counter 46 to increase its count by one. After the last ("m"th) row of elements of the last ("n"th) unit area of the "i"th row has been completed, the "m"th pulse appearing at the output 43 of the photoelectric detector 42 causes the counter 32 to reset, the counter 46 to overflow, the flip-flop 47 to be set to the "one" state and the data inputs 60, 61 and 62 of the registers 54, 55 and 56 (FIG. 8) to be connected, respectively, to the output of the storage device 50, the output of the register 54 and the output of the register 56. The AND gate 52 is supplied from the input 49 of the video signal source 11 with a signal permitting the passing of pulses from the output of the frequency divider 45 (FIG. 7) to the address input of the storage device 50 (FIG. 8) and the counter 46 (FIG. 7) is stored with the number "m". Thereupon, when the light beam falls on the first line following the shifted line on the disc 40, the storage location 70 of the register 55 (FIG. 8) is stored with the reflectivity of the first unit area of the "i+1"th row, the storage location 69 is stored from the output storage location of the register 54 with the reflectivity of the second unit area of the "i+1th row, the storage location 71 is stored with the reflectivity of the "m"th unit area of the "i"th row, the storage location 72 of the register 54 is stored with the reflectivity of the first unit area of the "i+2"th row, the storage location 73 of the register 56 is stored with the reflectivity of the first unit area of the "i"th row, and the input storage location of the register 54 is stored from the storage device 50 with the reflectivity of the second unit area of the "i+2"th row. The elements of the unit areas of the "i+1"th and subsequent rows are formed in the same way as described above for the unit areas of the "i"th row.

Figure 9:
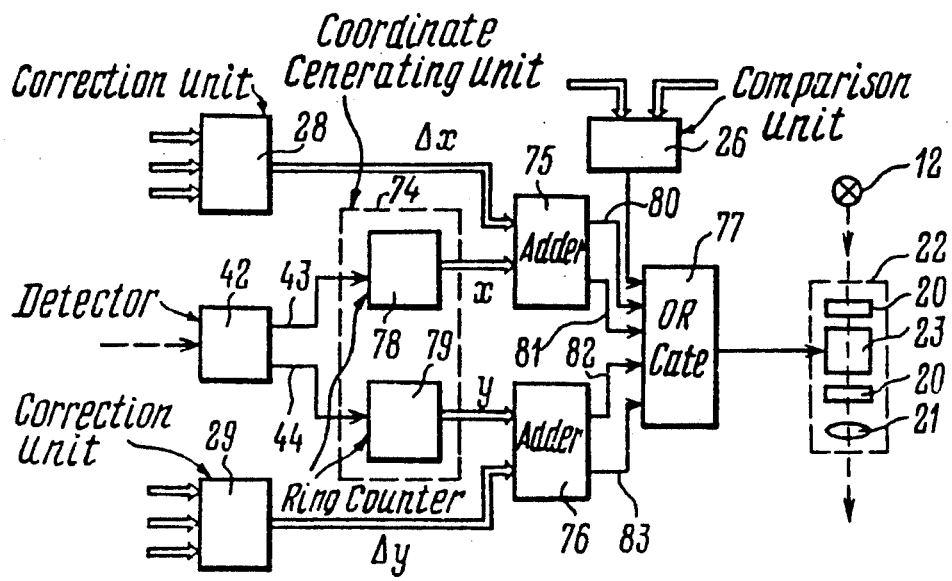
FIG. 9 is a block diagram of a circuit used together with the circuit shown in FIG. 7 when the half-tone function period differs from the repetition period of the image unit areas.

If the repetition period of the image unit areas differs from the period of the half-tone function, then, to form an element of a unit area on the receiving medium 13 light when the corresponding shifted element is outside this unit area, the circuit shown in FIG. 9 can be employed. This circuit is used together with the circuit shown in FIG. 7 and is connected to the latter circuit as shown in FIG. 9.

Referring to FIG. 9, the proposed apparatus further comprises a second coordinate generating unit 74 for generating the coordinates of the receiving medium unit areas, two adders 75 and 76, and an OR gate 77. The unit 74 comprises two ring counters 78 and 79, the counting inputs of these counters constituting the inputs of the unit 74 and being respectively connected to the outputs 43 and 44 of the photoelectric detector 42. The outputs of the counters 78 and 79 respectively constitute the "x" coordinate output and the "y" coordinate output of the unit 74. The inputs of the adder 75 are respectively connected to the output of the correction unit 28 and to the output of the counter 78. The inputs of the adder 76 are respectively connected to the output of the correction unit 29 and to the output of the counter 79. The adder 75 has a sign output 80 and a carry output 81, while the adder 76 has a sign output 83 and a carry output 84. In each of the adders 75 and 76 the signal at the sign output is logic zero when the sum of the summands applied to the adder is positive, and logic one when this sum is negative. The signal at the carry output of the adder 75 and 76 is logic zero when the sum of the summands applied to the adder is below a certain predetermined limit value, in this case, below the number "m" of the rows (columns) of elements in a receiving medium unit area. When the sum of the summands applied to the adder 75 and 76 is above this limit value, the signal at the carry output of this adder is log one. The output of the comparison unit 26 and the outputs 80, 81, 82 and 83 of the adders 75 and 76 are connected to the control input of the beam interrupter 73 through the OR gate 77.

As the drum 14 (FIG. 7) rotates, the counters 32 and 33, as in the previous case, are reset upon termination of each period of the half-tone function (in the directions of the axes X and Y, respectively), while the counters 80 and 81 are reset upon termination of each receiving medium unit area (in the directions of the axes X and Y, respectively). Therefore the counter 80 and 81 develop at their outputs "x" and "y" coordinate values each reckoned from a corresponding border of a corresponding unit area, i.e., representing the row or column number of a corresponding element of this unit area. These values are respectively summed with corrections $\Delta x$ and $\Delta y$ in the adders 75 and 76. If these corrections are not zeroes, the resulting sums will represent shifted element coordinate values reckoned from corresponding border of corresponding unit areas. If a shifted element remains within the corresponding unit area, both its coordinate values will be positive and smaller than the number "m" of the rows (columns) of elements in the unit area. In such an event the adders 75 and 76 develop at their outputs logic zeroes and the signal at the control input of the interrupter 23, according to which a corresponding element of the unit area is formed dark or light, is determined by the signal at the output of the comparison unit 26. If a shifted element is outside the corresponding unit area, then at least one of its coordinate values will be negative or greater than "m". In such an event at least one of the adders 75 and 76 develops at least one of its outputs 80–83 a signal of logic one which passes through the OR gate 77 to the control input of the interrupter 23, with the result that a corresponding units area element is formed light irrespective of the signal at the output of the comparison unit 26.

Figure 10:
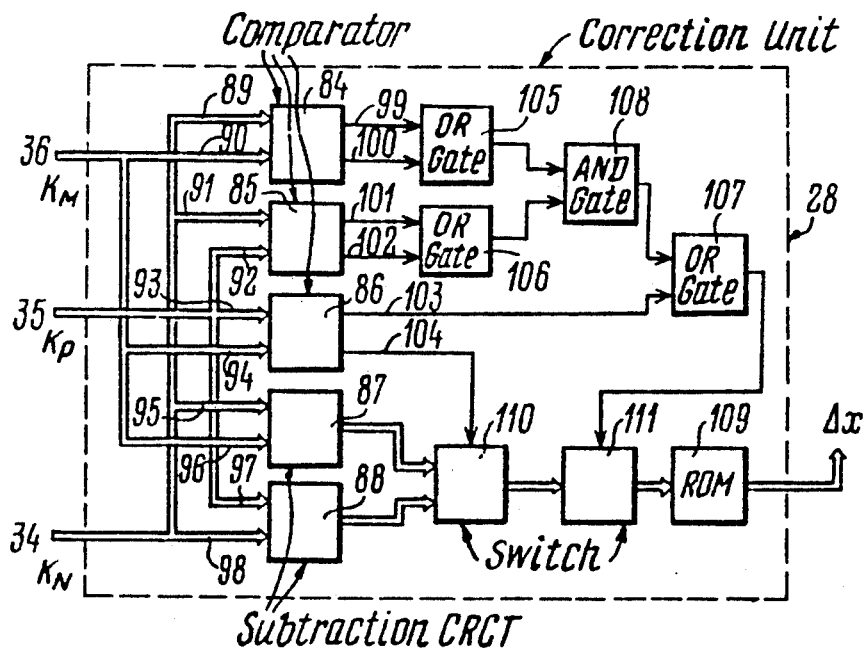
FIG. 10 is a block diagram of a correction unit employed in the apparatus shown in FIG. 7.

The coordinate correction units can be made as shown in FIG. 10. Referring to FIG. 10, the correction unit 28 comprises three comparators 84, 85 and 86, and two subtraction circuits 87 and 88. Each of the comparators 84, 85 and 86 and the subtraction circuits 87 and 88 has two inputs which are, respectively, inputs 89 and 90, 91 and 92, 93 and 94, 95 and 96, 97 and 98. The input 34 of the correction unit 289 is formed by the interconnected inputs 89, 91, 95 and 98 of the comparators 84 and 85 and subtraction circuit 87 and 88. The input 35 of the correction unit 28 is formed by the interconnected inputs 92, 93 and 97 of the comparators 86 and 85 and subtraction circuit 88. The input 36 is formed by the interconnected inputs 90, 94 and 96 of the comparators 84 and 86 and the subtraction circuit 87. Each of the comparators 84, 85 and 86 has two outputs which are, respectively, inputs 99 and 100, 101 and 102, 103 and 104. When a positive image is to be produced, the comparator 84 develops a signal of logic one at its output 99 if the signal at the input 89 is smaller than the signal at the input 90, and at its output 100 if the signal at the input 89 is equal to the signal at the input 90. The comparator 85 develops a signal of logic one at its output 101 if the signal at its input 91 is smaller than the signal at its input 92, and at the output 102 if the signal at the input 91 is equal to the signal at the input 92. The comparator 86 develops a signal of logic one at the output 103 if the signal at the input 93 is smaller than the signal at the input 94 and at the output 104 if the signal at the input 93 is equal to the signal at the input 94. The subtraction circuit 87 develops at its output a signal equal to the result of subtraction of the signal at its input 96 from the signal at its input 95. The subtraction circuit 88 develops at its output a signal equal to the result of subtraction of the signal at its input 98 from the signal at its input 97.

The correction unit 28 further comprises three OR elements 105, 106 and 107, an AND element 108 and a ROM 109. The inputs of the OR gate 105 are respectively connected to the outputs 99 and 100 of the comparator 84. The inputs of the AND gate 108 are respectively connected to the outputs of the OR gates 105 and 106. The inputs of the OR gate 107 are respectively connected to the output of the AND gate 108 and to the output 103 of the comparator 86. The address input of the ROM 109 is connected to the outputs of the subtraction circuits 87 and 88 through a two-way electronic switch 110 and a one-way electronic switch 111 connected between the switch 110 and the ROM 109. The control inputs of the switches 110 and 111 are respectively connected to the output 104 of the comparator 86 and to the output of the OR gate 107. The output of the ROM 109 is the output of the correction unit 28.

Figure 11:
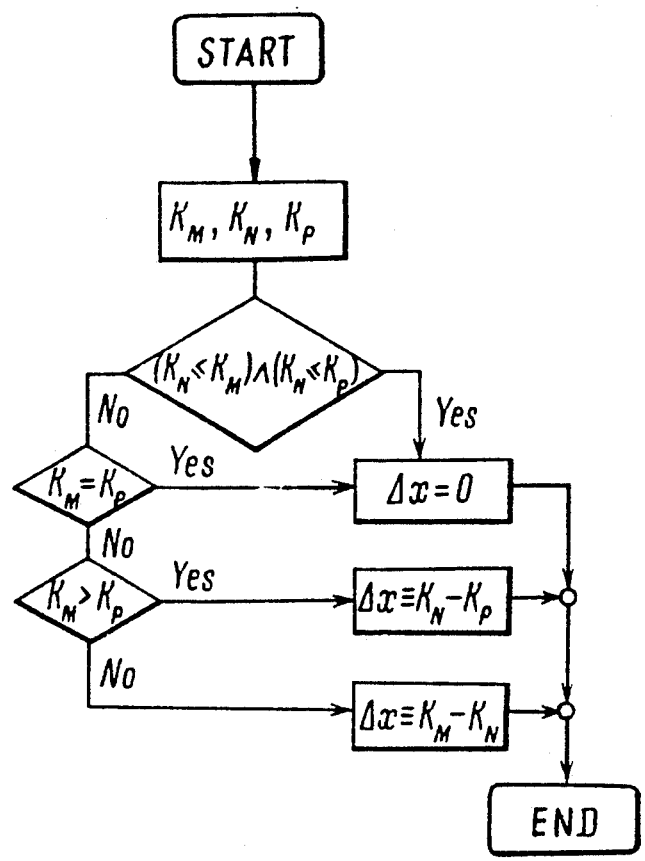
FIG. 11 is an algorythm explaining operation of the correction unit shown in FIG. 10.

The generation of a correction $\Delta x$ in the correction unit 28 when a positive image is produced on the receiving medium is explained by an algorithm shown in FIG. 11. The comparator 84 (FIG. 10) makes comparison between the reflectivity $K_N$ of the unit area N, an element of which is being formed on the receiving medium 13 (FIG. 7), and the reflectivity $K_M$ of the preceding unit area M adjoining the unit area N. The comparator 85 (FIG. 10) makes comparison between the reflectivity $K_N$ of the unit area N and the reflectivity $K_P$ of the next unit area P adjoining the unit area N. The comparator 86 makes comparison between the reflectivities $K_M$ and $K_P$ of the unit areas M and P. The subtraction circuits 87 and 88 develop at their outputs, respectively, the differences $K_N - K_M$ and $K_P - K_N$.

If the reflectivity of the unit area N does not exceed the reflectivity of any one of the unit areas M and P, i.e., none of the unit areas M and P is darker than the unit area N, then each of the comparators 84 and 85 develops at one of its outputs a signal of logic one. In such a case the control input of the switch 111 is supplied from the output of the AND gate 108 through the OR gate 107 with a signal of logic one which sets the switch 111 to a block state. Then the signal at the input of the ROM 109 is zero and the value of the correction $\Delta x$ is also zero. If the reflectivities of the unit areas M and P are equal to each other, the corrections $\Delta x$ and $\Delta y$ will also be zero because the control input of the switch 111 will be supplied with a logic one from the output 103 of the comparator 86.

If the reflectivity of one of the unit areas M and P is smaller than the reflectivity of the unit area N, and the reflectivities of the unit areas M and P are not equal to each other, the comparators 99–104 develop at their outputs 84–86 signals of logic zero, the control input of the switch 111 is supplied also with a logic zero and this switch is set to a conducting state. If the reflectivity of the unit area M is smaller than the reflectivity of the unit area P, the comparator 86 develops at its output 104 a signal of logic one which, being applied to the control input of the switch 110, sets it to a position at which the switch 111 is connected to the output of the subtraction circuit 87. Then the address input of the ROM 109 is supplied from the subtraction circuit 87 with a signal which is determined by the difference $K_N - K_M$ and has a positive sign. If the reflectivity of the unit area M is smaller than the reflectivity of the unit area P, the comparator 86 develops at its output 104 a signal of logic zero which, being applied to the control input of the switch 110, sets it to a position at which the switch 111 is connected to the output of the subtraction circuit 88. Then the address input of the ROM 109 is supplied from the subtraction circuit 88 with a signal which is determined by the difference $K_P - K_N$ and has a negatice sign.

The ROM 109, according to the signal at its address input, develops at its output a value equal to the number of elements by which the element determining by its coordinates the half-tone function value used to form a given element on the receiving medium should be shifted with respect to this given element along the axis X. The correction value at the output of the ROM 109 will have a positive sign if this correction value depends on the reflectivity of the unit area M, and a negative sign if it depends on the reflectivity of the unit area P.

If a negative image is to be produced, the comparators 84–86 should be made to provide generation of signals of logic one at their outputs 100, 102 and 104 when, respectively, the signal at the input 89 exceeds the signal at the input 90, the signal at the input 91 exceeds the signal at the input 92, and the signal at the input 93 exceeds the signal at the input 94. In such cases the correction $\Delta x$ is zero. If none of the unit areas M and P has a reflectivity value exceeding the reflectivity of the unit area N i.e., is lighter than the unit area N, the correction value depends on the reflectivity of the unit area M when it is lighter than the unit area P and on the reflectivity of the unit area P when it is lighter than the unit area M.

The correction unit 29 can be made in the same way as the correction unit 28, i.e., according to the block diagram shown in FIG. 10, wherein the inputs 34, 35 and 36 are respectively substituted by the inputs 37, 38 and 39.

By using a video signal source provided with shift registers for storing values characterizing reflectivities corresponding to the unit areas of one row of unit areas on the receiving medium 13 (FIG. 7), and values characterizing variation of each of these reflectivities in mutually opposite directions along each of two mutually perpendicular axes, it is also possible to make reproduction of images when the values characterizing variation of the reflectivity of an unit area are determined in a different way than by the difference between the reflectivities corresponding to the two adjacent unit areas of the same row and the two adjacent unit areas of the adjacent rows.

A video signal source provided with shift registers can be used, for example, when the values characterizing variation of reflectivity at the place of location of an unit area are the differences between the reflectivity of this unit area and the reflectivities of its four portions lying on different sides of two mutually perpendicular straight lines passing through the middle of the unit area; i.e., as described with reference to FIG. 6. In such a case the video signal source can comprise four shift registers each stored with the reflectivities of corresponding portions of image unit areas. The reflectivity of the whole unit area can be then calculated as the arithmetic mean of the reflectivities of the portions constituting this unit area, while the values characterizing variation of its reflectivity can be calculated as the differences between the reflectivities of the portions. In this case the reflectivities of the portions of a unit area are stored in the corresponding shift registers simultaneously, for which purpose the inputs of the registers are connected to the output of the storage device wherein the data concerning the reflectivities are stored. The inputs of the registers remain connected to the storage device during formation of the first element rows in each row of unit areas on the receiving medium 13 (FIG. 7), i.e., during one revolution of the drum 14, whereupon the input of each shift register is connected to its output until the beginning of formation of the first element rows in the next row of unit areas. The values characterizing variation of reflectivity are converted in the correction units 28 and 29 to corrections which should be applied to the coordinate values of the elements of corresponding unit areas.

Instead of the counter 46 and the flip-flop 47 it is possible to employ a cyclic frequency divider consisting of a shift register having "m" singlebit storage locations. The data input of the first storage location is constantly supplied with a signal of logic one, while the data storage enable input of the shift register is connected to the output of the last storage location, the latter output being also connected to the control input 49 of the video signal source 11. The clock input of the shift register is connected to the output 44 of the photoelectric detector 42. In such a cyclic frequency divider the shift register develops a signal of logic one at the output of its last storage location upon application of "m" pulses to its clock input.

The data stored in the storage device 50 (FIG. 8) can be located in such a way that the data stored at each address represents the reflectivity values of five image unit areas, one of which is the unit area N and the other four are the unit areas M, P, R and S adjoining the unit area N. In such a case the counting input of the address counter 53 can be supplied with pulses directly from the frequency divider 45 (FIG. 7), while the output of the counter 53 (FIG. 8) is connected to the address input of the storage device 50 through a code converter (not shown). The code converter converts the code at the output of the counter 53 in such a way that during formation of the elements of each row of unit areas on the receiving medium the sequence of codes supplied to the address input of the storage device 50 is repeated after each revolution of the drum 14 (FIG. 7). The counter 46 (FIG. 8) and the flip-flop 47 in this case can be omitted. However, with the data so located in the storage device 50, the reflectivity of each image unit area must be stored therein at five different addresses, which will lead to a corresponding increase in the size of the storage device 50 (FIG. 8).

Similarly, in the case of reproduction of an image according to FIG. 6, the data stored at each address in the storage device 50 (FIG. 8) can represent the reflectivities of the four portions of the unit area N. In such a case, instead of four shift registers, the video signal source 11 includes one shift register having four multi-bit storage locations the outputs of which are connected to the storage device 50.

The code converter can be omitted if the apparatus is capable of forming simultaneously "m" elements constituting one column of elements in a unit area. For this purpose "m" beams of light must be simultaneously directed to the receiving medium, i.e., it is necessary to have "m" beam interrupters, "m" half-tone function generating units and "m" comparing units.

When the image on the receiving medium 13 (FIG. 7) is reproduced directly from the original image, the video signal source, instead of a storage device and registers, can comprise five reading heads one of which generates a signal corresponding to the reflectivity of the unit area N, while the four others generate signals corresponding to the reflectivities of the unit areas M, P, R and S, or four reading heads each generating a signal corresponding to the reflectivity of one portion of the unit area N. These heads scan the original image on a drum rotating in synchronism with the drum 14. During each "m" revolutions of the drums the reading heads are shifted by one unit area along the axis of the drum from which the image is read. The drums can be in this case synchronized mechanically, e.g., by mounting them on the same shaft, without using the frequency divider 45, the counter 46 and the flip-flop 47, or other electronic circuits for supplying synchronizing pulses to the video signal source.

When the light beam produced by the source 12 is controlled by the video signal source 11 via a communication channel, it is necessary to transmit over this channel, in addition to the reflectivities of the unit areas of the image being reproduced, corrections Δx and Δy. This may lead to an increase in the amount of information which must be transmitted over the communication channel. It is known, however, that the human eye has a low contrast sensitivity when perceiving contours of an image and small strokes, i.e., the areas in which, according to the present invention, half-tone dots are shifted. And, conversely, when perceiving background portions of an image, where reflectivity does not vary or varies smoothly, the human eye has a very high contrast sensitivity. This makes it possible, without imparing the perception of an image, to decrease the amount of information concerning the reflectivity of one of the unit areas in which half-tone dots are shifted and to transmit corrections over a communication channel almost without increase in the overall amount of information transmitted over this channel. A circuit permitting corrections Δx and Δy to be transmitted in this manner is shown in FIG. 12.

Figure 12:
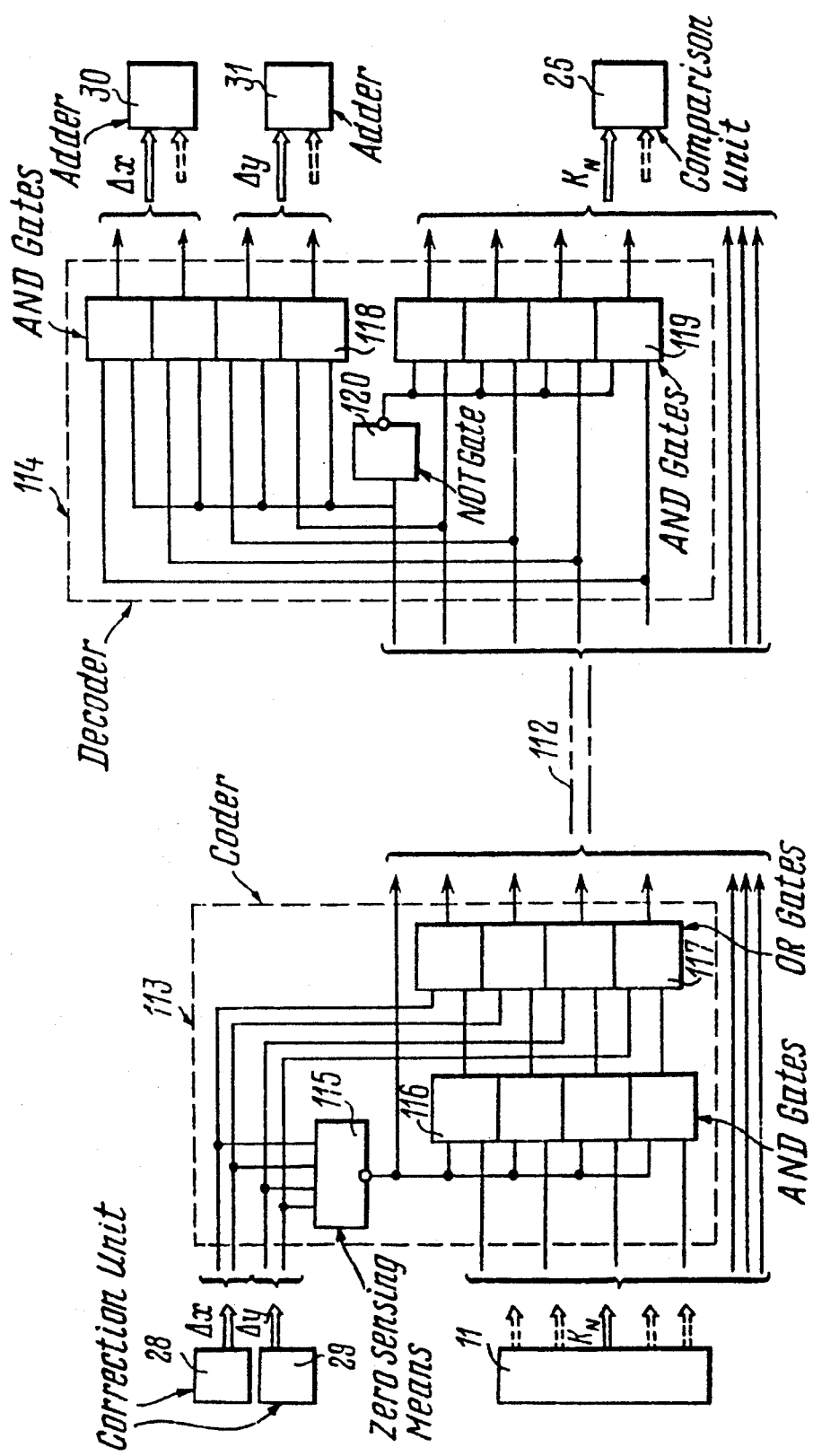
FIG. 12 is a block diagram of a device for transmitting over a communication channel correction signals generated in the apparatus shown in FIG. 7.

Referring to FIG. 12, the output 15 of the video signal source 11, i.e., the output of the register unit 51 (FIG. 8), and the outputs of the correction units 28 and 29 (FIG. 12) are connected to the corresponding input of the comparison unit 26, i.e., the input which should be supplied with the reflectivity value of the unit area to be formed on the receiving medium 13 (FIG. 7), and to the corresponding inputs of the adders 30 and 31, i.e., the inputs which should be supplied with corrections Δx and Δy, via a communication channel 112 (FIG. 12). One (the input) end of the communication channel 112 is connected to one portion of bit position lines of the output 15 of the video signal source 11 directly and to the second (the remaining) portion of the bit position lines of the output 15 and to the bit position lines of the outputs of the correction units 28 and 29 through a coder 113. The other (the output) end of the communication channel 112 is directly connected to one portion of the bit position lines of the input of the comparison unit 26 and through a decoder 114 is connected to the other portion of the input bit position lines of the comparison unit 26 and to the bit position lines of the inputs of the adders 30 and 31.

The coder 113 comprises a zero correction signal sensing means constituted by a NOR gate 115 having its inputs respectively connected to the output bit position lines of the correction units 28 and 29, and a group 116 of AND gates.

One input of each of the AND gates 116 is connected to a corresponding line of said second portion of the lines constituting the input 15 of the video signal source. Another input of each of the AND gates 116 is connected to the output of the NOR gate 115. The coder 113 further comprises a group 117 of OR gates each having one input connected to a corresponding output bit position line of the correction units 28 and 29. Another input of each of the OR gates 117 is connected to the output of a corresponding AND gate of the group 116.

The decoder 114 comprises a group 118 of AND gates having their outputs respectively connected to the input bit position lines of the adders 30 and 31, a group 119 of AND gates, and a NOT gate 120. One input of each of the AND gates 118 is connected through the communication channel 112 to the output of the NOR gate 115. Each of the AND gates 119 has one input connected to the output of the NOR gate 115 through the communication channel 112 and the NOR gate 120. Another input of each of the AND gates 119 is connected to the input of a corresponding AND gate of the group 118 and through the communication channel 112 is connected to the output of a corresponding AND gate 116 of the coder 113.

During reproduction of the unit areas which are intersected by an image contour the half-tone dots formed on these unit areas are shifted. In such a case at least one of the corrections Δx and Δy generated at the outputs of the correction units 28 and 29 will not be zero and the signal applied to the AND gates 116 of the coder 113 from the NOR gate 115 will be zero. As a result, the binary signals which are applied from a corresponding portion of the bit position lines constituting the output 15 of the video signal source 11 to the AND gates 116 and which correspond to the lower order digits of the number indicative of the reflectivity of a corresponding image unit area do not pass to the inputs of the OR gates 117, so that only the binary signals applied from the remaining portion of the bit position lines of the output 15 and corresponding to the higher order digits of the binary number indicative of said reflectivity are transmitted over the communication channel 112. The communication channel 112 also transmits binary signals characterizing corrections Δx and Δy from the outputs of the OR gates 117. The zero signal from the output of the NOR gate 115 through the communication channel 112 is also applied to the NOT gate 120 of the decoder 114. The NOT gate 120 develops at its output a signal of logic one which permits the binary signals applied through the communication channel 112 from the outputs of the OR gates 116 and characterizing corrections Δx and Δy to pass through the AND gates 119. As a result, these corrections appear at the corresponding inputs of the adders 30 and 31 and are used to shift a corresponding half-tone dot. The zero signal from the output of the NOR gate 115 through the communication channel 112 is also applied to the AND gates 119 of the decoder 112, blocking the passage of signals from the outputs of the AND gates 111 to the corresponding input of the comparison unit 26. As a result, this input is supplied through the communication channel 112 only with binary signals corresponding to the higher order digits of the number characterizing the reflectivity. Therefore the reflectivity value is transmitted over the communication channel 112 with relatively low accuracy. However, since the human eye has a low contrast sensitivity when perceiving contours of an image and small strokes, transmission of the reflectivity value even with relatively low accuracy provides a sufficiently good quality of image reproduction.

During reproduction of unit areas corresponding to a background portion of the image, where the half-tone dots are not shifted, the corrections Δx and Δy generated at the outputs of the correction units 28 and 29 are zeroes and the signals applied tot he AND gates 116 of the coder 113 from the NOR gate 115 is logic one. As a result, the binary signals corresponding to the lower order digits of the number indicative of the reflectivity of a corresponding unit area are passed to the inputs of the OR gates 117 and transmitted over the communication channel 112, along with the binary signals corresponding to the higher order digits of this number. The signal of logic one from the output of the NOR gate 115 through the communication channel 112 is also applied to the AND gates 119 and the NOT gate 120 of the decoder 114. The NOT gate 120 develops at its output a zero signal applied to the OR gates 118 and blocking the passage of signals from the outputs of the OR gates 116 to the inputs of the adders 30 and 31. At the same time the signals corresponding to the lower digits of the number indicative of the reflectivity and applied from the OR gates 116 through the communication channel 112 are passed through the AND gates 119 to the input of the comparison unit 26. In this case the reflectivity value is transmitted over the communication channel 112 with relatively high accuracy, which is necessary to provide a sufficient quality of reproduction of an image background portion because the human eye has a high contrast sensitivity when perceiving such a portion of an image.

Therefore, to transmit corrections Δx and Δy in the circuit shown in FIG. 12, it is necessary to transmit over a communication channel only one additional binary signal, viz., a signal indicative of the presence of at least one of these corrections or of their absence.

While the invention is described herein in the terms of the preferred embodiments, various modifications may be made without departure from the spirit and scope of the invention as defined in the appended claims.

What is claimed is:

1. A method of making a half-tone reproduction of an image on a receiving medium, comprising the steps of:
   generating signals corresponding to reflectivities of image unit areas;
   determining for each of said image unit areas values characterizing variation of reflectivity of the place of location of this unit area in two mutually opposite directions along each of two mutually perpendicular axes;
   comparing the signal corresponding to the reflectivity of each of said image unit areas with signals corresponding to values of a half-tone function which is a two-dimensional periodic function of two mutually orthogonal coordinates of elements into which receiving medium unit areas respectively corresponding to the image unit areas are divided; and
   forming said elements of said receiving medium unit areas in such a way that,
   if the reflectivity at the place of location of a given image unit area in both the mutually opposite directions along each of said mutually perpendicular axes does not vary in a predetermined sense or varies to an equal degree, then each given element of the receiving medium unit area corresponding to said given image unit area is formed light when the half-tone function value determined by the coordinates of said element differs from the reflectivity of said given image unit area in said predetermined sense, and dark when the half-tone function value determined by the coordinates of said given element differs from the reflectivity of said given image unit area in an opposite sense, and
   if the reflectivity at the place of location of a given image unit area varies in said predetermined sense in any one of the mutually opposite directions along any one of said mutually perpendicular axes, whereas in an opposite direction it varies in the same sense to a lesser degree or in an opposite sense, then, to form each given element of the receiving medium unit area corresponding to said given image unit area, the position of a shifted element is determined, the shifted element being shifted with respect to said given element along an axes in the direction of the lesser degree of variation of the reflectivity in said predetermined sense or in the direction of variation of the reflectivity in an opposite sense, the greater the degree of the shift, greater the degree of variation of the reflectivity in the direction opposite to the shift, and, if said shifted element lies within the same unit area as said given element the latter is formed light when the half-tone function value determined by the coordinates of said shifted element differs from the reflectivity of said image unit area in said predetermined sense, and dark when the half-tone function value determined by the coordinates of said shifted element differs from the reflectivity of said given image unit area in an opposite sense, and, if said shifted element lies outside the unit area within which lies said given element, the latter is formed light.

2. A method according to claim 1, wherein said values characterizing variation of reflectivity at the place of location of an image unit area are the differences between the reflectivity of said unit area and the reflectivity of each of four adjacent unit areas, two of which adjoin said unit area on opposite sides and are disposed therewith along one of said mutually perpendicular axes, and the other two of which adjoin said unit area on opposite sides and are disposed therewith along another of said mutually perpendicular axes.

3. A method according to claim 1, wherein said values characterizing variation of reflectivity at the place of location of an image unit area are differences between the reflectivity of said unit area and the reflectivity of each of its two portions lying on different sides of a straight line passing through the middle of said unit area along one of said mutually perpendicular axes and between the reflectivity of said unit area and the reflectivity of each of its two portions lying on different sides of a straight line passing through the middle of said unit area along another of said mutually perpendicular axes.

4. An apparatus for making a half-tone reproduction of an image on a receiving medium, comprising:
  a light source;
  a means for sequentially directing the light beam of said light source to elements of the unit areas of said receiving medium which correspond to image unit areas or said image;
  a controlled beam interrupter for interrupting the light beam of said light source, said interrupter having a control input;
  a video signal source having a first output, a second output, a third output, a fourth output and a fifth output for producing at said first output a reflectivity value of an unit area of said image unit areas corresponding to an unit area of said receiving medium areas incorporating the element to which the light beam of said light source is being directed, producing at said second and third outputs, respectively, reflectivity values of two auxiliary image unit areas lying in a region of the image unit area the reflectivity of which is being produced at said first output, on different sides of one of two mutually perpendicular lines passing through the middle of said image unit area, and producing at said fourth and fifth outputs, respectively, reflectivity values of two auxiliary image unit areas lying in a region of the image unit area the reflectivity of which is being produced at said first output, on different sides of another of said two mutually perpendicular axes;
  a coordinate generating unit for generating coordinates of said elements of the receiving medium unit areas, said coordinate generating unit having an input, a first coordinate output and a second coordinate output;
  a timing means for timing signals produced at said outputs of said video signal source and said coordinate generating unit with movement of the light beam of said light source over said elements of the receiving medium unit areas;
  a half-tone function generating unit for generating values of a half-tone function which is a periodic function of the coordinates of said elements of the receiving medium unit areas, said half-tone function generating unit having a first coordinate input, a second coordinate input and an output;
  a comparison unit having a first input connected to said first output of the video signal source, a second input connected to said output of the half-tone generating unit, and an output connected to said control input of the beam interrupter;
  a first correction unit for correcting a first coordinate of said elements of said receiving medium unit areas, said first correction unit having a first input connected to said first output of the video signal source, a second input connected to said second output of the video signal source, a third input connected to said third output of the video signal source, and an output;
  a second correction unit for correcting a second coordinate of said elements of the receiving medium unit areas, said second correction unit having a first input connected to said first output of the video signal source, a second input connected to said fourth output of the video signal source, a third input connected to said fifth output of the video signal source, and an output, each of said correction units being adapted to produce at its output a signal having a sign which depends on the sign of the difference between the signals at said second and third inputs, and a value which is a function of the difference between the signals at said first input and the difference of the signals at said second and third inputs which differs from the other of the signals at said second and third inputs in a predetermined sense, if the signal at said first input differs from at least one of the signals at said second and third inputs in the same sense and the signals at said second and third inputs are different, and to produce at said output of the correction unit a zero signal in all other cases;
  a first adder having a first input connected to said first coordinate output of said coordinate generating unit, a second input connected to said output of the first correction unit, and an output connected to said first coordinate input of the half-tone function generating unit; and
  a second adder having a first input connected to said second coordinate output of the coordinate generating unit, a second input connected to said output of the second correcting unit, and an output connected to said second coordinate input of the half-tone generating unit.

5. An apparatus according to claim 4, further comprising:

a second coordinate generating unit for generating coordinates of said elements of the receiving medium unit areas, said second coordinate generating unit having a first coordinate output and a second coordinate output;

a third adder having two inputs respectively connected to said first coordinate output of the second coordinate generating unit and to said output of the first correction unit, a sign output and a carry output; and a fourth adder having two inputs respectively connected to said second coordinate output of the second coordinate generating unit and to said output of the second correction unit, a sign output and a carry output, said sign and carry outputs of said third and fourth adders being connected to said control input of the beam interrupter for interrupting the light beam of said light source when a sum of the signals at said inputs of any one of said third and fourth adders falls outside predetermined limits.

6. An apparatus according to claim 4, wherein each of said correction units comprises:

first and second subtraction units, each having a first input, a second input and an output;

first, second and third comparators, each having a first input, a second input, a first output and a second output for producing a predetermined logic signal at said first output when a signal at said first input differs in a predetermined sense from a signal at said second input, and the same logic signal at said second output when a signal at said first input is equal to a signal at said second input;

a two-way switch having two inputs respectively connected to said outputs of the subtraction circuits, a control input and an output;

a one-way switch having an input connected to said output of the two-way switch, a controlled input and an output;

a read-only memory having an address input connected to said output of the one-way switch, and an output forming said output of the correction unit;

a first OR gate having two inputs respectively connected to said outputs of the first comparator, and an output;

a second OR gate having two inputs respectively connected to said outputs of the second comparator, and an output;

an AND gate having two inputs respectively connected to said outputs of the first and second OR gates and an output;

a third OR gate having two inputs respectively connected to said outputs of the AND gate and to said first output of the third comparator, and an output connected to said controlled input of the one-way switch, wherein said first input of said first comparator being connected to said first input of said second comparator, to said first input of said first subtraction circuit and to said second input of said second subtraction circuit and forming said first input of the correction unit; said second input of said first comparator being connected to said second input of said third comparator and to said second input of said third subtraction circuit and forming said third input of the correction unit; said second input of said second comparator being connected to said first input of said third comparator and to said first input of said second subtraction circuit and forming said second input of the correction unit; and, said second output of said third comparator being connected to said control input of the two-way switch.

7. An apparatus according to claim 4, wherein said first input of the video signal source, said outputs of the correction units and said inputs of said first and second adders each has a plurality of bit position lines, said apparatus further comprising;

a communication channel;

a coder including a zero correction signal sensing means having a plurality of inputs and an output, the inputs of one portion of said inputs being respectively connected to said bit position lines of the output of the first correction unit, the inputs of another portion of said inputs being respectively connected to said bit position lines of the output of second correction unit;

a group of AND gates each having a first input, a second input and an output, said first inputs of said AND gates being respectively connected to the bit position lines of a portion of said bit position lines of the first output of the video signal source, said second inputs of said AND gates being connected to said output of the zero connection signal sensing means;

a group of OR gates each having an input connected to a corresponding output bit position line of a corresponding correction unit, a second input connected to an output of a corresponding AND gate, and an output; and a decoder including a first group of AND gates, each having a first input, a second input and an output, a second group of AND gates, each having a first input, a second input, and an output, said first inputs of the AND gates of said first and second groups being connected through said communication channel to said output of the zero corrections signal sensing means, so that said first inputs of the AND gates of said first input group are supplied with a signal inverted with respect to the signal supplied to said first inputs of the AND gates of said second group, said second inputs of the AND gates of said first group begin respectively connected to said second inputs of the AND gates of said second group and through said communication channel respectively connected to said outputs of said OR gates of the decoder, the outputs of one portion of said outputs of the AND gates of said first group being respectively connected to said bit position lines of the first input of the first adder, the outputs of another portion of said outputs of the AND gates of said first group being respectively connected to said bit position lines of the first input of the second adder, said outputs of the AND gates of said second group being respectively connected to lines of a portion of said bit position lines of the second input of the comparison unit, the lines of another portion of said bit position lines of the first input of the video signal source being respectively connected through said communication channel to lines of another portion of said bit position lines of the second input of the comparison unit.

* * * * *